United States Patent
Minato et al.

(10) Patent No.: US 7,680,415 B2
(45) Date of Patent: Mar. 16, 2010

(54) OPTICAL CODE DIVISION MULTIPLEXING TRANSMISSION AND RECEPTION METHOD AND OPTICAL CODE DIVISION MULTIPLEXING TRANSCEIVER

(75) Inventors: Naoki Minato, Tokyo (JP); Akihiko Nishiki, Tokyo (JP); Hideyuki Iwamura, Tokyo (JP); Takashi Ushikubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/355,312

(22) Filed: Jan. 16, 2009

(65) Prior Publication Data
US 2009/0190927 A1 Jul. 30, 2009

Related U.S. Application Data

(63) Continuation of application No. 11/284,971, filed on Nov. 23, 2005, now abandoned.

(30) Foreign Application Priority Data

Nov. 26, 2004 (JP) .............................. 2004-341616

(51) Int. Cl.
*H04J 4/00* (2006.01)
*H04J 14/08* (2006.01)
(52) U.S. Cl. .............................. 398/77; 398/78; 398/99; 398/155
(58) Field of Classification Search .................... 398/77, 398/78, 98, 99, 155, 89
See application file for complete search history.

(56) References Cited

U.S. PATENT DOCUMENTS 6,292,282 B1 * 9/2001 Mossberg et al. .............. 398/99

(Continued)

FOREIGN PATENT DOCUMENTS

JP 07-079216 3/1995

(Continued)

OTHER PUBLICATIONS

Sotobayashi et al. ("Transparent Virtual Optical Code/Wavelength Path Network", IEEE Journal of selected topics in quatum electronics, vol. 8, No. 3, May/Jun. 2002).*

(Continued)

*Primary Examiner*—M. R. Sedighian
(74) *Attorney, Agent, or Firm*—Rabin & Berdo, P.C.

(57) ABSTRACT

An object of the present invention is to provide an OCDM transceiver with which the reduction amount of the intensity of the correlation waveform signal is smaller than that of a conventional device of the same type in the decoding step that comprises a time gate processing step. Hence, in the OCDM transceiver of the present invention that comprises an encoding portion and a decoding portion, the decoding portion is constituted comprising a decoder, clock extractor, and time gate. The decoder decodes an encoded optical pulse signal and separates the encoded optical pulse signal into a clock signal extraction signal and an optical pulse signal playback signal. The clock extractor extracts a clock signal from the clock signal extraction signal. Further, the time gate removes only the auto-correlation waveform component from the optical pulse signal playback signal. The auto-correlation waveform component is converted to an electrical signal by means of an optical receiver and generated as a reception signal.

15 Claims, 10 Drawing Sheets

U.S. PATENT DOCUMENTS 7,174,103 B2 * 2/2007 Nishiki et al. .................. 398/77
7,308,199 B2 12/2007 Kim et al.

FOREIGN PATENT DOCUMENTS

| | | |
|---|---|---|
| JP | 2000-209186 | 7/2000 |
| JP | 2002-218457 | 8/2002 |
| JP | 2003-149612 | 5/2003 |
| JP | 2004-112093 | 4/2004 |

OTHER PUBLICATIONS

X. Wang et al., "Enhancement of Transmission Data Rates in Incoherent FO-CDMA Systems", OECC 2000, 14A2 to 5, p. 458, (2000).

Ken-ichi Kitayama et al., "Optical Code Division Multiplexing (OCDM) and Its Applications to Photonic Networks", IEICE Trans. Fundamentals, vol. E82-A, No. 12 (1999).

Hideyuki Sotobayashi et al., "Transparent Virtual Optical Code/Wavelength Path Network", IEEE Journal of Selected Topics in Quantum Electronics, vol. 8, No. 3(2002).

Japanese Office Action dated Dec. 17, 2008.

* cited by examiner

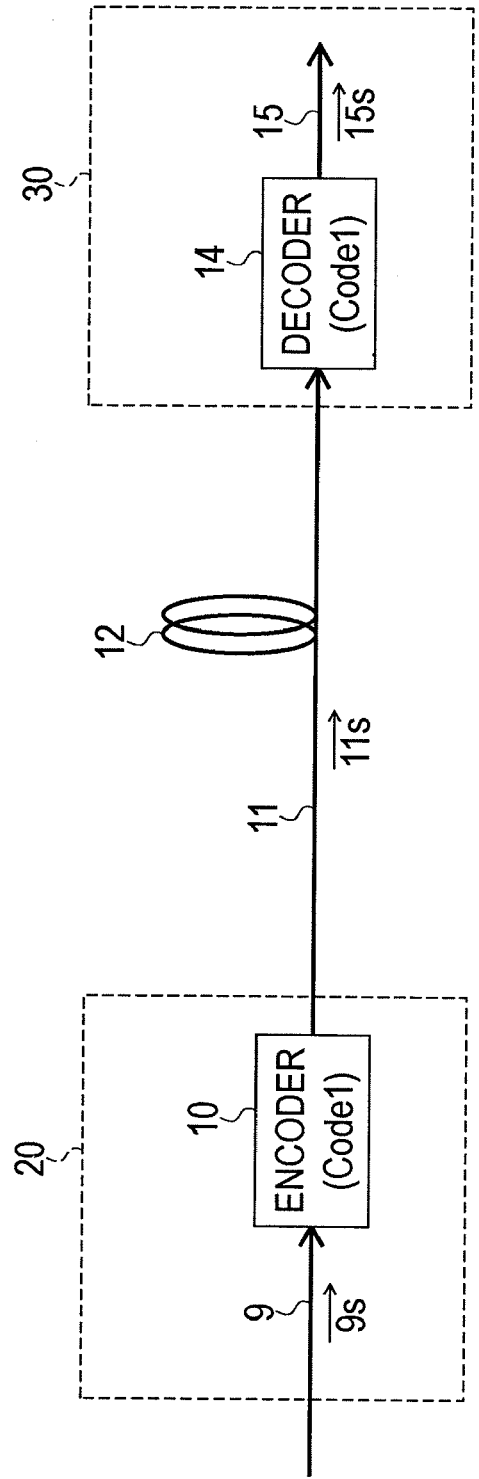
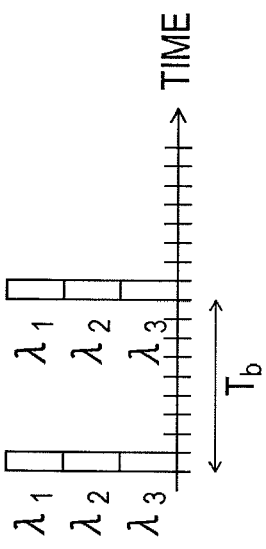
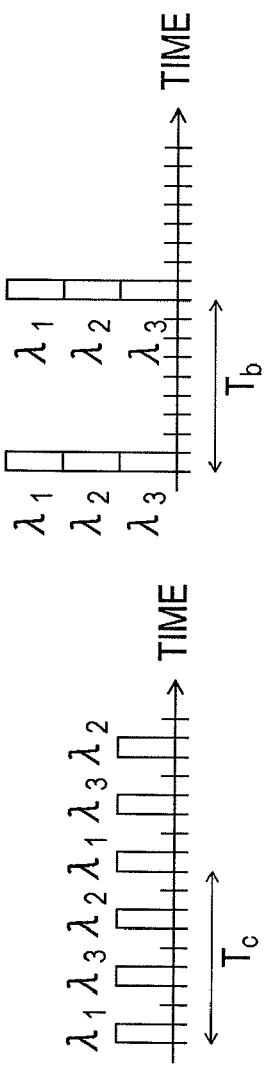
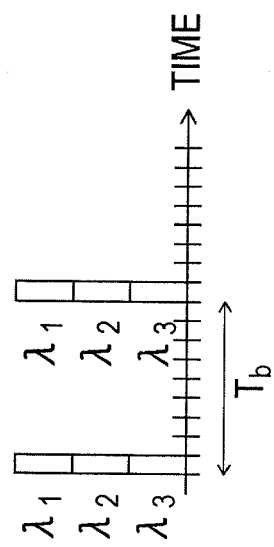

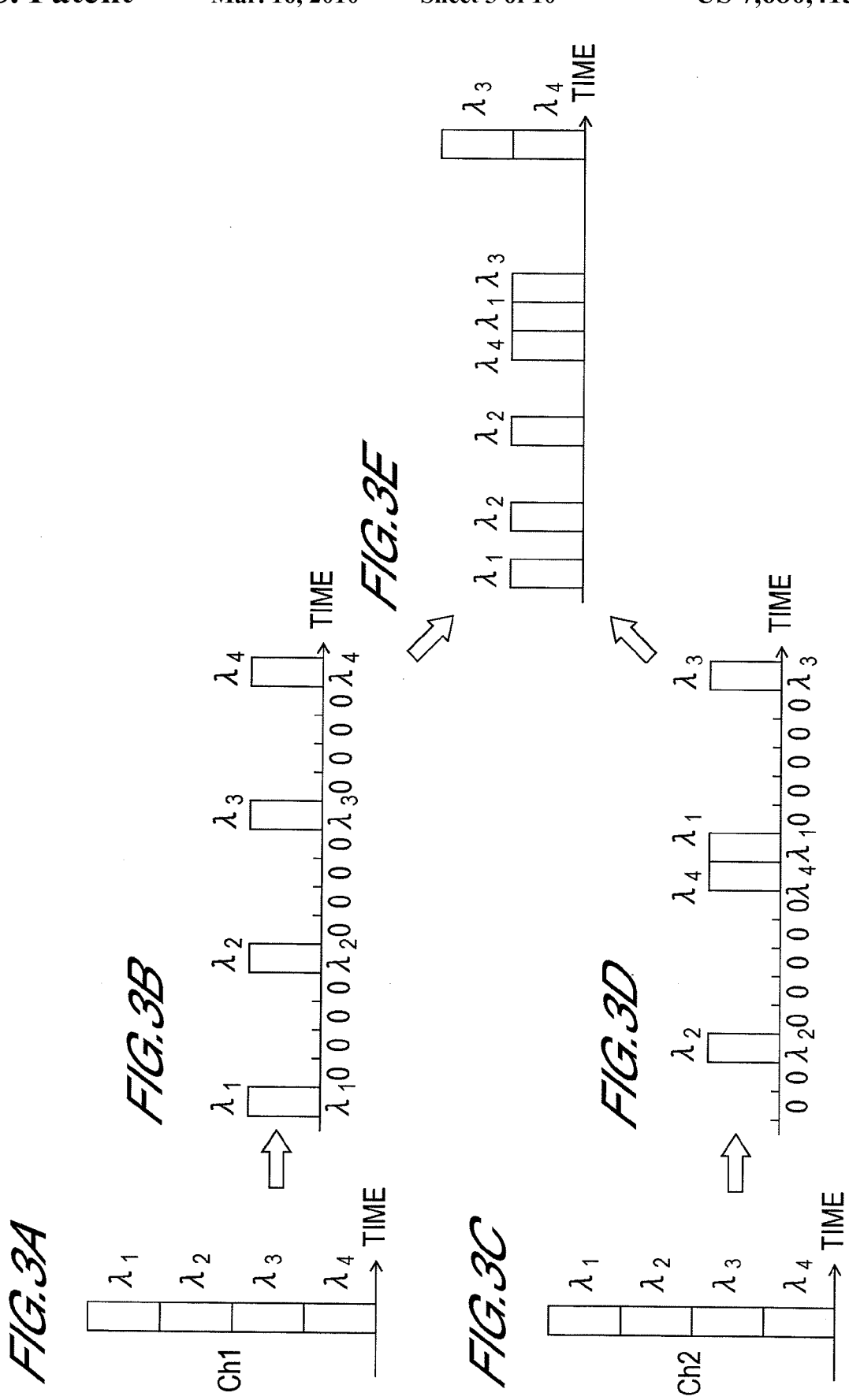

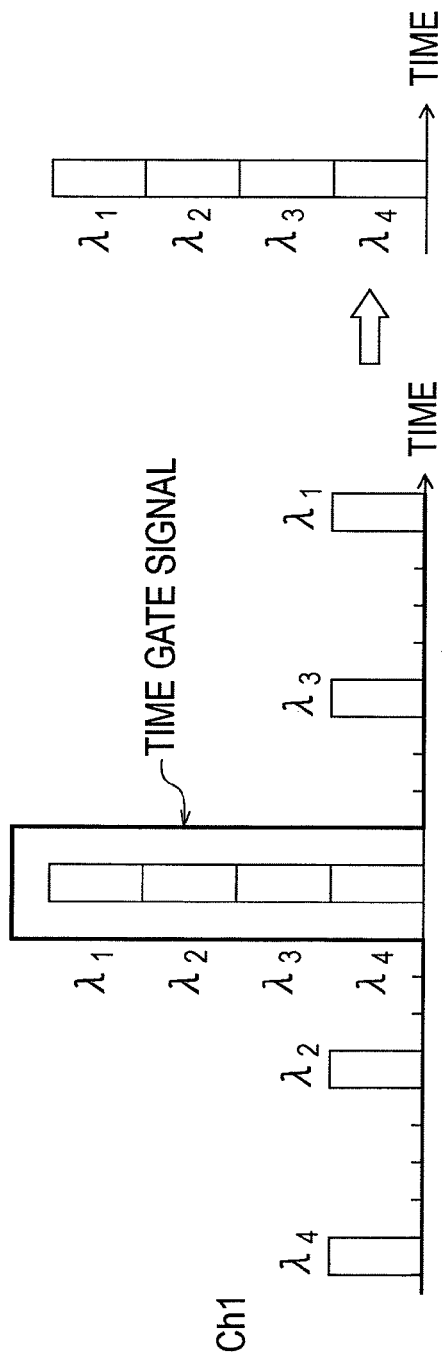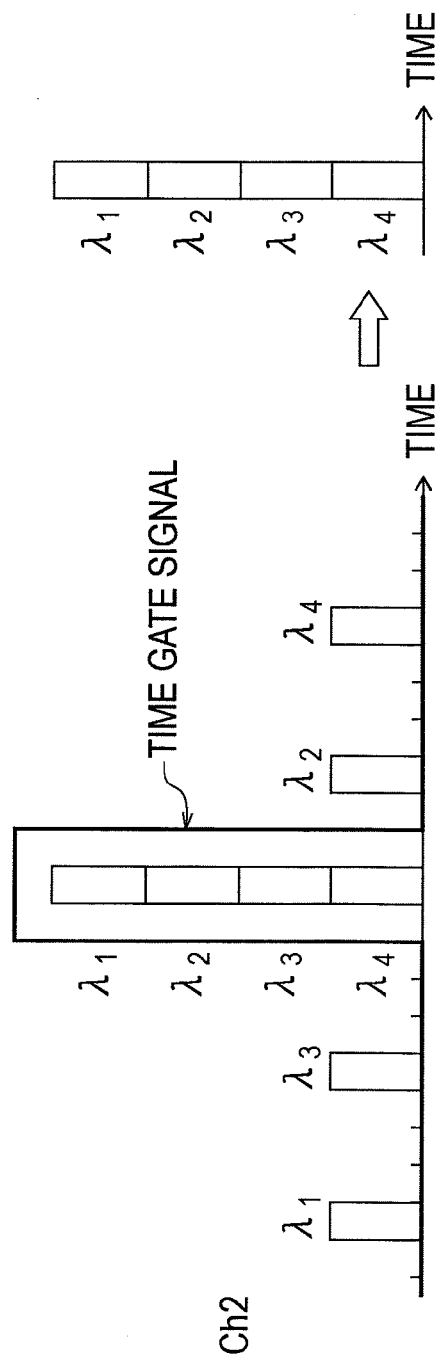

OPTICAL CODE DIVISION MULTIPLEXING TRANSMISSION AND RECEPTION METHOD AND OPTICAL CODE DIVISION MULTIPLEXING TRANSCEIVER

CROSS-REFERENCE TO RELATED PATENT APPLICATION

This application is a continuation of U.S. patent application Ser. No. 11/284,971, filed Nov. 23, 2005, the subject matter of which application is incorporated herein by reference in its entirety.

This application claims the benefit of Japanese Patent Application No. 2004-341616, filed on Nov. 26, 2004, in the Japanese Property Office, the disclosure of which is incorporated herein in its entirety by reference.

BACKGROUND OF THE INVENTION

1. Field of the Invention

The present invention relates to an optical transceiver and, more particularly, to encoding and clock signal extraction means for an optical code division multiplexing (OCDM) transceiver.

2. Description of Related Art

Metro-areas that are located between long-distance networks (also known as an 'Internet backbone') and access lines necessitate higher communication speeds and increased capacities. Although bit rates of Internet backbones have already been secured up to Terabit communication bandwidths, higher communication speeds and larger capacities for metro areas have fallen behind. Subsequently, when the background of the expansion of the Internet and advances made with wider bandwidths for content is considered, there is a demand for higher communication speeds and larger capacities in metro areas.

In order to afford communications a larger capacity, optical multiplexing technology that transmits a plurality of channels' worth of optical pulse signals all together over a single optical fiber transmission line has been studied. In optical multiplexing technology, optical time division multiplexing (OTDM), wavelength division multiplexing (WDM), and OCDM have been vigorously researched. Of these, OCDM possesses flexibility from an application standpoint, that is, superior characteristics such as that of not being restricted on the time axis allocated to each single bit of the optical pulse signal that is sent and received by OTDM and WDM.

OCDM communication is a communication method that extracts a signal by means of pattern matching by allocating different codes (patterns) to each channel. That is, OCDM is optical multiplexing technology that encodes, on the transmission side, an optical pulse signal by means of an optical code that is different for each communication channel and which, on the reception side, performs decoding to restore the original optical pulse signal by using an optical code that is the same as that of the transmission side for each communication channel.

During decoding, processing is performed to extract, as a valid signal, only an optical pulse signal in which code is mixed and, therefore, an optical pulse signal that comprises the same wavelengths or light rendered by combining the same wavelengths can be allocated to a plurality of communication channels. Further, an optical encoder is capable of using a passive optical element such as a Fiber Bragg Grating (FBG) and is therefore not subject to electrical restrictions, whereby adaptation for an increased signal rate is possible. Further, a plurality of channels can be multiplexed with the same wavelength at the same time, whereby high-capacity data communications are made possible. In comparison with OTDM and WDM, OCDM is noteworthy in that the communication capacity can increase very quickly.

Encoding and decoding methods include direct spreading methods, time spreading methods, wavelength hopping methods, and time spreading/wavelength hopping methods and so forth. Hereinafter, code that is used in time spreading/wavelength hopping methods is known as time spreading/wavelength hopping code. The present invention is an invention relating to OCDM that employs time spreading/wavelength hopping code (see Japanese Patent Application Laid Open No. 2000-209186, "Enhancement of transmission data rates in incoherent FO-CDMA systems", X. Wang and K. T. Chan, OECC 2000, 14A2 to 5, p. 458, (2000), "Optical Code Division Multiplexing (OCDM) and Its Applications to Photonic Networks", Ken-ichi Kitayama, Hideyuki Sotobayashi, and Naoya Wada, IEICE Trans. Fundamentals, Vol. E82-A, No. 12 (1999), and "Transparent Virtual Optical Code/Wavelength Path Network", Hideyuki Sotobayashi, Wataru Chujo, and Ken-ichi Kitayama, IEEE Journal of Selected Topics in Quantum Electronics, Vol. 8, No. 3 (2002), for example).

Therefore, the principles of encoding and decoding using time spreading/wavelength hopping code will first be explained with reference to FIGS. 1A to 1D, and FIGS. 2A to 2D.

FIG. 1A serves to illustrate encoding and decoding in a case where code set for an encoder and code set for a decoder are the same. Further, FIGS. 1B to 1D illustrate the process from the point where an optical pulse signal is encoded and transmitted until same is received and decoded. That is, the appearance of an optical pulse signal before and after encoding and before and after decoding is shown with respect to the time axis. Meanwhile, FIG. 2A serves to illustrate encoding and decoding in a case where code set for an encoder and code set for a decoder are different. Further, FIGS. 2B to 2D are the same as FIGS. 1B to 1D. In FIGS. 1B to 1D and 2B to 2D, the horizontal axis is a time axis that shows time by means of an optional scale and the vertical axis shows light intensity by means of an optional scale.

For the sake of expediency in the following description, an expression such as an optical pulse signal is used only in cases where an optical pulse train that reflects a binary digital electrical signal obtained by converting an electrical pulse signal to an optical pulse signal by light-modulating an optical pulse train is intended. Meanwhile, the expression of an optical pulse train is used to indicate the totality of lined up optical pulses over a fixed interval that is regular on a time axis ('data cycle' sometimes appears hereinafter). A data cycle is also generally called a 'time slot'.

Furthermore, the bit rate, which expresses the communication speed, is the speed indicating whether it is possible to send and receive information on how many bits per unit time and is the reciprocal of the data cycle. Further, the maximum spread time per bit (one optical pulse) is also known as the code cycle. That is, the code cycle is the maximum time width that is allocated to each optical pulse constituting an optical pulse signal on the time axis of an encoded optical pulse signal. In FIGS. 1B to 1D and 2B to 2D, the data cycle is indicated by $T_b$ and the code cycle is indicated by $T_c$.

In FIGS. 1B to 1D and 2B to 2D, the optical pulses are schematically shown as follows. That is, the optical pulses that constitute the optical pulse signal are not actually square waves as illustrated but are shown as square waves for the sake of expediency. Further, in FIGS. 1B to 1D and 2B to 2D, the optical pulses constituting the optical pulse signals are shown as a mixture of light of three different wavelengths (λ1, λ2, and λ3). In order to indicate that this is light of the wavelengths λ1, λ2, and λ3, the references λ1, λ2, and λ3 are appended to the rectangles representing the optical pulses.

For example, in FIG. 1B, the optical pulses constituting the optical pulse signals are generated from light rendered by mixing the wavelengths λ1, λ2, and λ3. Therefore, the rectangles to which the codes of λ1, λ2, and λ3 have been appended are shown stacked on the time axis. The same is true for FIGS. 1D and 2B. On the other hand, in FIGS. 1C and 2C, an optical pulse signal is encoded and the optical pulses are spread over the time axis. Therefore, optical pulses that are shared for each unit data cycle are arranged divided into optical pulses (also known as 'chip pulse' hereinafter) with a single wavelength for each of the wavelengths λ1, λ2, and λ3.

In order to represent this situation, FIGS. 1C and 2C show chip pulses by means of rectangles to which codes such as λ1 and λ2 are appended in correspondence with the wavelength of each chip pulse. As will be described subsequently, in the OCDM transceiver of the present invention, the respective optical pulses constituting an optical pulse signal must be generated from light rendered by mixing light of mutually different wavelengths in at least a number equal to the number of multiplexed channels The encoding and decoding when code set for the encoder and code set for the decoder are the same will now be described with reference to FIGS. 1A to 1D. As shown in FIG. 1A, on the transmission side 20, an optical pulse signal 9s is encoded by an encoder 10 with a function for encoding by means of code supplied by Code 1, whereby an encoded optical pulse signal 11s is generated. The encoded optical pulse signal 11s is a signal generated by performing encoding by dividing the optical pulse signal 9s into chip pulses to form an array by means of time spreading/wavelength hopping code.

That is, the encoder 10 has a function for dividing and arranging optical pulses that constitute the optical pulse signal 9s one by one into chip pulses by generating a time lag difference between wavelengths components on the time axis. When the process in which the optical pulse signal 9s is divided into chip pulses by the encoder 10 is considered, it is clear that this is a process in which one optical pulse is spread and arranged on the time axis and hopping is performed for each wavelength. As a result, encoding performed by the encoder 10 is called time spreading/wavelength hopping encoding.

An encoded optical pulse signal 11s is transmitted to the reception side 30 as a result of propagation through an optical fiber which is a transmission line 12. On the reception side 30, a playback optical pulse signal 15s that is the same as the original optical pulse signal 9s is played back as a result of decoding by a decoder 14 with a function for decoding by means of code that is supplied by Code 1. The optical pulse signal 9s is generated by intensity-modulating the optical pulse train to the RZ (Return-to-Zero) format. FIG. 1B schematically shows the optical pulse signal 9s. Further, FIG. 1C schematically shows the encoded optical pulse signal 11s. In addition, FIG. 1D schematically shows the played back playback optical pulse signal 15s.

The same code supplied by Code 1 is set for the encoder 10 and decoder 14 shown in FIG. 1A. Hence, as shown in FIG. 1D, the playback optical pulse signal 15s that is intensity modulated to the RZ format like the optical pulse signal 9s is played back. That is, the optical pulse signal 9s is transmitted safely to the reception side 30. As shown in FIG. 1D, when encoded, the playback optical pulse signal 15s that is obtained as a result of being decoded by the same code is also known as the auto-correlation waveform of the optical pulse signal 9s.

On the other hand, when the code of the encoder and the code of the decoder are different, the playback optical pulse signal is not obtained. How to perform the aforementioned encoding and decoding when the code of the encoder and code of the decoder are different will be described with reference to FIGS. 2A to 2D.

As shown in FIG. 2A, on the transmission side 20, the encoded optical pulse signal 11s is generated as a result of encoding by the encoder 10, which has a function for encoding the optical pulse signal 9s by means of code that is supplied by Code 1. The encoded optical pulse signal 11s is the same signal as that shown in FIG. 1C. The encoding light pulse signal 11s transmitted to the reception side 32 as a result of being propagated by the optical fiber, which is transmission line 12. On the reception side 32, the encoded optical pulse signal 11s is decoded by a decoder 16 with a function for decoding by means of code that is supplied by Code 2, whereby the playback optical pulse signal 17s is obtained. FIG. 2D schematically shows the decoded playback optical pulse signal 17s.

Code supplied by Code 1 is set for the decoder 10 shown in FIG. 2A while code supplied by Code 2 is set for the decoder 16. Because Code 1 and Code 2 supply different code, the decoder 16 does not play back the optical pulse signal that corresponds to the original optical pulse signal 9s. A waveform from which the original optical pulse signal 9s cannot be recovered as shown in FIG. 2D is also known as a cross-correlation waveform with respect to the optical pulse signal 9s.

In OCDM that uses time spreading/wavelength hopping, an optical pulse signal is transmitted after being encoded and multiplexed by using code that is distinct on the transmission side for each channel. Thereafter, a signal that is transmitted by multiplexing a plurality of channels is also called an optical code division multiplexed signal.

The optical code division multiplexed signal is decoded on the reception side. The waveform obtained through the decoding takes the form of the sum of an auto-correlation waveform component and a cross correlation waveform component. This is because a plurality of channels' worth of optical pulse signals that have undergone time spreading/wavelength hopping are multiplexed in an optical code division multiplexed signal. That is, this is because code that is used when encoding is performed on the transmission side and code set for the decoder is mixed in the optical code division multiplexed signal along with channels that match and channels that do not match.

The waveform that is to be extracted from the waveforms that are outputted from the decoder on the reception side is only the auto-correlation waveform component. That is, the cross correlation waveform component constituting the waveform outputted from the decoder is a noise component of the auto-correlation waveform component. One of the indices for evaluating the reception quality is the ratio of the intensities of the auto-correlation waveform component and cross correlation waveform component. That is, the greater the intensity of the auto-correlation waveform component among the waveforms outputted from the decoder, the better the reception quality. Therefore, a study of how the cross correlation waveform component can be effectively removed from the waveforms outputted from the decoder was undertaken.

Means for removing the cross correlation waveform component include a method of performing time gate processing (See "Optical Code Division Multiplexing (OCDM) and Its Applications to Photonic Networks", Ken-ichi Kitayama, Hideyuki Sotobayashi, and Naoya Wada, IEICE Trans. Fundamentals, Vol. E82-A, No. 12 (1999), for example). Time gate processing is a method of adjusting the reception timing for each channel so that the auto-correlation waveform component and cross correlation waveform component do not overlap on the time axis after decoding. That is, this is a method for extracting only the auto-correlation waveform component by allowing the auto-correlation waveform component to pass by opening the gate for only the time required for the auto-correlation waveform component to pass after decoding and by closing the gate in the time zone in which the cross correlation waveform component passes through.

Time gate processing will be described by taking the example of a case where two-channel multiplexing transmission in OCDM using time spreading/wavelength hopping code with reference to FIGS. 3A to 3E and 4A to 4D. Further, thereafter, when reference is made to the whole of a plurality of drawings such as FIGS. 3A to 3E, for example, an unmixed range of drawings is sometimes abbreviated simply as FIG. 3. That is, when abbreviated simply as FIG. 3, this denotes FIGS. 3A to 3E.

The horizontal axis, which shows the state of an optical pulse that is shown in FIGS. 3 and 4, is the time axis that has been scaled using an optional scale and the vertical axis scales the optical intensity by means of an optional scale.

FIG. 3 serves to illustrate a description of the encoding of two-channel multiplexing OCDM. FIG. 4 serves to illustrate decoding that includes time gate processing of two-channel multiplexing OCDM. Here, for the sake of simplicity, the first channel (abbreviated as 'Ch1' in FIGS. 3 and 4) and second channel (abbreviated as 'Ch2' in FIGS. 3 and 4) are a single optical pulse. The single optical pulse is generated from light rendered by mixing light of wavelengths of four types which are $\lambda 1$, $\lambda 2$, $\lambda 3$, and $\lambda 4$.

FIGS. 3 and 4 show optical pulses as square waves as shown in FIGS. 1B to 1D and 2B to 2D. In order to illustrate the fact that this is light of the wavelengths $\lambda 1$, $\lambda 2$, $\lambda 3$, and $\lambda 4$, the codes $\lambda 1$, $\lambda 2$, $\lambda 3$, and $\lambda 4$ are appended in the rectangles representing the square waves. Because a single optical pulse is generated from light rendered by mixing light of the wavelengths $\lambda 1$, $\lambda 2$, $\lambda 3$, and $\lambda 4$, rectangles to which the codes $\lambda 1$, $\lambda 2$, $\lambda 3$, and $\lambda 4$ have been appended are shown stacked on the time axis.

The first channel in FIG. 3 will be described first. A single optical pulse of the first channel is shown in FIG. 3A. The optical pulse is generated from light rendered by mixing light of the wavelengths $\lambda 1$, $\lambda 2$, $\lambda 3$, and $\lambda 4$. The optical pulse shown in FIG. 3A is encoded by code supplied by Code 1 and, as shown in FIG. 3B, has a shape rendered through division into chip pulses and arrangement by means of time spreading/wavelength hopping on the time axis.

In keeping with the rule that the wavelengths of chip pulses should be arranged with respect to the positions in which the chip pulses exist and 0's should be arranged with respect to the positions where chip pulses do not exist, on the time axis, supposing that code is shown in the form of a progression that is lined up on one row on the time axis, the code supplied by Code 1 is written as ($\lambda 1$, 0,0,0,0, $\lambda 2$, 0,0,0,0, $\lambda 3$, 0,0,0,0, and $\lambda 4$). Thereafter, the fact that code supplied by Code 1 is shown by means of the above progression is abbreviated in the format Code 1=($\lambda 1$, 0,0,0,0, $\lambda 2$, 0,0,0,0, $\lambda 3$, 0,0,0,0, and $\lambda 4$).

That is, it can be considered that code that is supplied by Code 1 is a function in which a single optical pulse on the time axis is converted to chip pulses that are arranged distributed along the time axis in a sequence that is provided by the above progression. Naturally, the code supplied by Code 1 is a function that plays the role of converting the respective optical pulses of a plurality of optical pulses (optical pulse signal) into chip pulses that are arranged distributed along the time axis in a sequence that is provided by the sequence supplied by the above progression.

Similarly, the second channel of FIG. 3 will now be described. A single optical pulse of the second channel is shown in FIG. 3C. As per the first channel, the optical pulse is also generated from light that is rendered by mixing light of the wavelengths $\lambda 1$, $\lambda 2$, $\lambda 3$, and $\lambda 4$. The optical pulse of the second channel that is shown in FIG. 3C is encoded by code that is supplied by Code 2 and has a shape rendered through arrangement by means of time spreading/wavelength hopping on the time axis as shown in FIG. 3D.

Similarly to the code used for the first channel and Code 1, the code used for the second channel and Code 2 are expressed in the form of a progression as follows. That is, Code 2=(0,0, $\lambda 2$, 0,0,0,0,0, $\lambda 4$, $\lambda 1$, 0,0,0,0,0, $\lambda 3$).

The result of multiplexing the first and second channels above is the arrangement shape of the channel pulses shown in FIG. 3E (encoded optical pulses). The arrangement of chip pulses shown in FIG. 3E combines the encoded optical pulses of the first channel that are encoded by means of Code 1 shown in FIG. 3B and the encoded optical pulses of the second channel that are encoded by means of Code 2 shown in FIG. 3D.

An aspect in which decoding is performed on the reception side will be described next with reference to FIG. 4. On the reception side, a chip pulse train for the optical pulses of the encoded first and second channels shown in FIG. 3E is divided into a number of channels (two here). As a result, the first channel is divided into the chip pulse train shown in FIG. 4A and the second channel is divided into the chip pulse train shown in FIG. 4C.

The chip pulse train of the first channel shown in FIG. 4A is outputted from the gate such that the gate signal for the first channel allows only the auto-correlation waveform component to pass while blocking the other chip pulses. The auto-correlation waveform of the first channel is shown in FIG. 4A such that the rectangles to which the codes $\lambda 1$, $\lambda 2$, $\lambda 3$, and $\lambda 4$ are appended are stacked vertically on the time axis. The auto-correlation waveform for the first channel that is outputted by the gate is shown in FIG. 4B.

Similarly, the chip pulse train of the second channel shown in FIG. 4C is outputted from the gate such that the gate signal for the second channel allows only the auto-correlation waveform component to pass while blocking the other chip pulses. The auto-correlation waveform of the second channel is similarly shown in FIG. 4C such that the rectangles to which the codes $\lambda 1$, $\lambda 2$, $\lambda 3$, and $\lambda 4$ are appended are stacked vertically on the time axis. The auto-correlation waveform for the second channel that is outputted by the gate is shown in FIG. 4D.

As described earlier, only the auto-correlation waveform from which the cross correlation waveform has been removed is played back by performing time gate processing on the reception side. Thus, the reception quality can be improved by performing time gate processing.

In order to implement time gate processing, it is necessary to allow the auto-correlation waveform component to pass by opening the time gate after decoding for the time taken for the auto-correlation waveform component to pass and to close the time gate in the time zone in which the cross correlation waveform passes. For this purpose, there must be synchronization between the time for opening and closing the time gate by means of any method and the time taken for the auto-correlation waveform component to pass. That is, a clock signal for acquiring synchronization must be extracted.

Therefore, a method in which an optical signal of a waveform that is rendered by combining a decoded cross correlation waveform and an auto-correlation waveform component (this optical signal is sometimes referred simply as a 'cross correlation signal' hereinafter) is divided into two and one part is used for extraction of the clock signal while the optical pulse signal is extracted from the other has been proposed (See "Transparent Virtual Optical Code/Wavelength Path Network", Hideyuki Sotobayashi, Wataru Chujo, and Ken-ichi Kitayama, IEEE Journal of Selected Topics in Quantum Electronics, Vol. 8, No. 3 (2002), for example).

However, in order to divide the correlation waveform signal into two parts by means of a branching filter and extract the clock signal from one part, it is necessary to divide the correlation waveform signal into two by means of an optical branching filter up until the cross correlation waveform is removed after decoding the optical code division multiplexed signal. Hence, the intensity of the correlation waveform signal decreases as a result of the branching loss of the optical branching filter and the insertion loss through insertion into the optical branching filter. As a result, there is the problem that the signal to noise ratio (SNR) of the played back optical pulse signal constituting the reception signal decreases. There is also the problem that of the increase in the number of parts constituting the receiver on the reception side that comprises the decoding function.

SUMMARY OF THE INVENTION

Therefore, an object of the present invention is to provide an OCDM transceiver that is capable of solving the problem that the intensity of the correlation waveform signal decreases and the problem that the number of parts constituting the receiver increases.

In order to solve the above problem, the present invention is an optical code division multiplexing transmission and reception method that comprises an encoding step and a decoding step, wherein the decoding step contains a playback optical pulse signal separation step, a clock signal extraction step, and a time gate processing step.

The encoding step is a step in which an optical pulse signal that is allocated to each channel and transmitted that contains light of distinct wavelengths in a number equal to the number of channels is encoded by using a time spreading/wavelength hopping code that is distinct for each channel in order to generate an encoded optical pulse signal. The decoding step is a step in which the encoded optical pulse signal of each channel is decoded by using the same code as the time spreading/wavelength hopping code in order to generate a playback optical pulse signal that contains an auto-correlation waveform component and cross correlation waveform component for the optical pulse signal.

The playback optical pulse signal separation step is a step for dividing the playback optical pulse signal into a clock signal extraction signal comprising one waveform component of the light contained in the optical pulse signal and an optical pulse signal playback signal comprising the remaining waveform component. The playback optical pulse signal separation step utilizes the Bragg reflection characteristic, for example.

The step of extracting a clock signal is a step of extracting a clock signal from a clock signal extraction signal. The time gate processing step is a step for extracting only the auto-correlation waveform component from the optical pulse signal playback signal.

The optical code division multiplexing transmission and reception method is implemented by the OCDM transceiver of the present invention. The OCDM transceiver of the present invention comprises an encoding portion and decoding portion and the decoding portion comprises a decoder, clock extractor, and time gate.

The encoding step and decoding step are each implemented by an encoding portion and decoding portion. More particularly, the decoder that the decoding portion comprises implements the steps of generating a playback optical pulse signal and dividing the playback optical pulse signal into a clock signal extraction signal and an optical pulse signal playback signal. The decoder is suitably constituted comprising an FBG, for example. Further, the step of extracting a clock signal is implemented by the clock extractor and the time gate processing step is implemented by the time gate.

The OCDM transceiver of the present invention simultaneously implements a step of generating a playback optical pulse signal that comprises an auto-correlation waveform component and cross correlation waveform component of the optical signal by means of the decoder and a playback optical pulse signal separation step. Hence, an optical branching filter for separating the clock signal extraction signal from the playback optical pulse signal comprising the auto-correlation waveform component and cross correlation waveform component of the optical pulse signal that is required by OCDM transceivers of the same type as the present invention is not required.

Therefore, the insertion loss that is produced as a result of using the optical branching filter in the decoding step that includes the time gate processing step is not produced. That is, if the OCDM transceiver of the present invention is used, the decrease in intensity of the optical pulse signal playback signal (correlation waveform signal) caused by separating the clock signal extraction signal from the playback optical pulse signal can be reduced below that of conventional devices of the same type. As a result, the problem with the decrease in the S/N ratio of the played back optical pulse signal constituting the reception signal can be solved.

Further, because the optical branching filter that is required by conventional devices of the same type is no longer required, the number of parts including auxiliary parts required for installation of an optical branching filter can be reduced. Therefore, the problem that the number of parts constituting the decoding portion increases can be resolved.

BRIEF DESCRIPTION OF THE DRAWINGS

The foregoing and other objects, features and advantages of the present invention will be better understood from the following description taken in connection with the accompanying drawings, in which:

FIG. 1 serves to illustrate encoding and decoding employing time spreading/wavelength hopping code in a case where the code of an encoder and the code of a decoder are the same;

FIG. 3 serves to illustrate the encoding of two-channel multiplexing OCDM;

FIG. 4 serves to illustrate the time gate processing in the decoding of two-channel multiplexing OCDM;

DESCRIPTION OF THE PREFERRED EMBODIMENTS

Figure 2A:
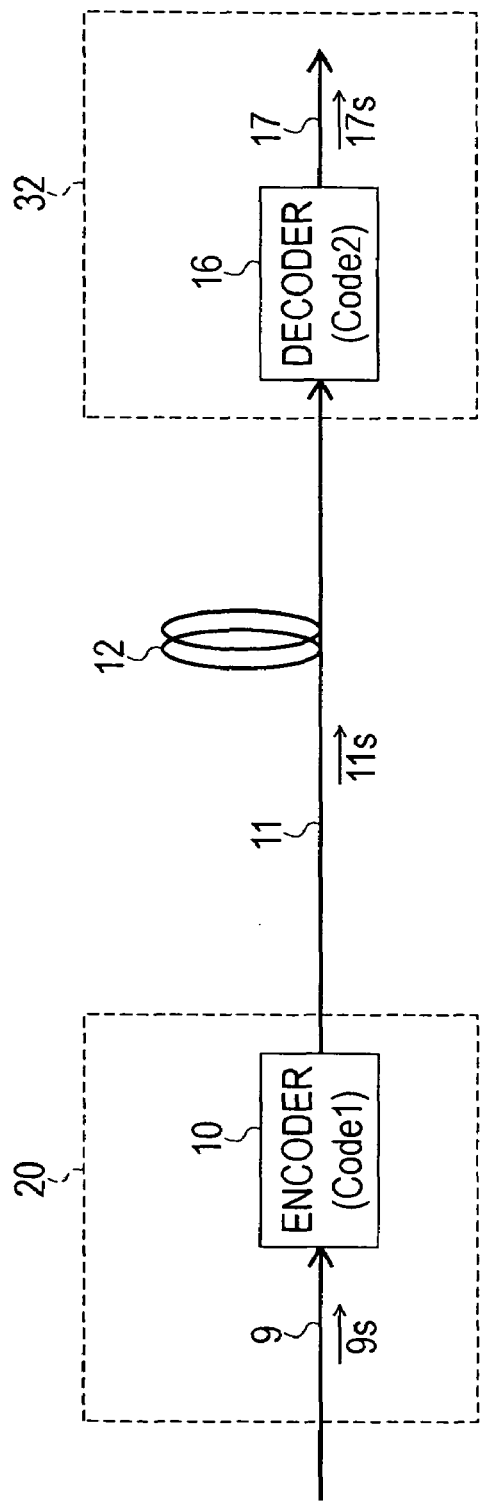
FIG. 2 serves to illustrate encoding and decoding employing time spreading/wavelength hopping code in a case where code set for an encoder and code set for a decoder are different.
Figure 2D:
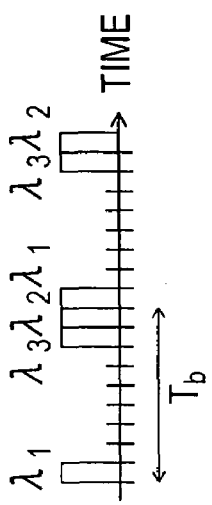
Figure 2C:
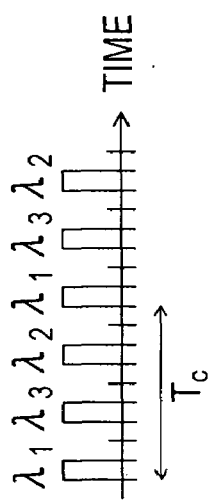
Figure 2B:
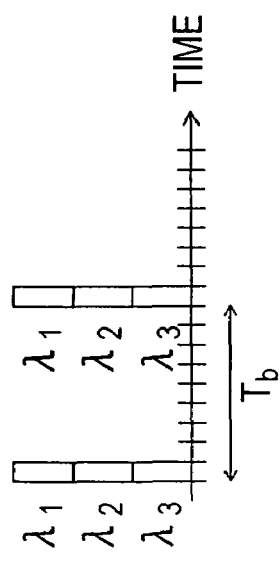

Embodiments of the present invention will be described hereinbelow with reference to the drawings. Further, each figure only shows a constitutional example of the present invention and only schematically shows the cross-sectional shape and dispositional relationship and so forth of each constituent element to the extent of permitting an understanding of the present invention. The present invention is not limited to the illustrated examples. Further, although specified materials and conditions and so forth are sometimes employed in the following description, these materials and conditions constitute only one of the suitable examples and the present invention is therefore in no way limited to or by such materials and conditions and so forth. Further, the same numbers are sometimes shown appended to the same constituent elements in each of the drawings and repeated descriptions are sometimes avoided.

In the drawings shown hereinbelow, the path of an optical pulse signal in an optical fiber or the like is shown using a thick line, while the paths of electrical signals is shown using thin lines. Further, as well as indicating the paths of these signals, the codes appended to these thick and thin lines sometimes signify optical pulse signals or electrical signals that travel along the respective paths of these signals.

OCDM Transceiver

The constitution and functions of the OCDM transceiver of the present invention will be described with reference to FIG. 5. Although an OCDM transceiver with a four-channel constitution is shown by way of example in FIG. 5, the OCDM transceiver of the present invention is not limited to having four channels. The following description is valid for a constitution with any number of channels.

The OCDM transceiver has a constitution in which an encoded optical pulse signal is generated for each channel by means of the transmission portion 40 and the encoded optical pulse signals of all the channels are multiplexed by means of a mixer 70 and transmitted as a transmission signal 72s to a reception portion 80 as a result of propagation via an optical transmission line 72.

The transmission signal 72s rendered by multiplexing the encoded optical pulse signals of all the channels transmitted to the reception portion 80 is divided according to intensity into a number that is equal to the number of channels as encoded optical pulse signals by a branching filter 82. Encoded optical pulse signals 81a, 81b, 81c, and 81d thus intensity-divided are each inputted to a first channel 100 of the reception portion of the reception portion 80, a second channel 102 of the reception portion, a third channel 104 of the reception portion, and a fourth channel 106 of the reception portion.

First, a function part for producing an optical pulse train constituting a base for generating the optical pulse signal that is the transmission signal of each channel and supplying the optical pulse train to each channel will first be described. This part is constituted comprising a multi-wavelength pulse light source 42 and branching filter 44.

The multi-wavelength pulse light source 42 is a light source that produces continuous wave light that includes distinct oscillation wavelengths in a number equal to the number of channels. The light produced by the multi-wavelength pulse light source 42 may include at least distinct oscillation wavelengths in a number equal to the number of channels and, even when this light includes oscillation wavelengths in a number exceeding the number of channels, this has no effect on the operation of the OCDM transceiver of the present invention. Therefore, in the following description, the multi-wavelength pulse light source 42 is described as being a light source that produces continuous wave light including distinct oscillation wavelengths in a number equal to the number of channels.

The multi-wavelength pulse light source 42 can be constituted using a Distributed Feed Back-Laser Diode (DFB-LD) with distinct oscillation wavelengths in a number equal to the number of channels, for example, as a light-emitting source. That is, continuous wave light that includes distinct oscillation wavelengths in a number equal to the number of channels can be generated by mixing the oscillation light of the DFB-LD in a number equal to the number of channels by means of an optical mixer (not shown).

A light source that is constituted to perform conversion to an optical pulse train by means of an optical modulator (not shown) such as an Electro Absorption Modulator (EAM) and output the optical pulse train from the end of one optical fiber is the multi-wavelength pulse light source 42. The optical modulator that is used to generate an optical pulse train from the continuous wave light is not limited to an EAM. It is also possible to use a Mach-Zehnder Interference Type Optical Modulator that utilizes the Pockels effect. The characteristic that the optical modulator is supposed to have is that of being capable of high-speed optical modulation by means of the bit rate of the OCDM transceiver of the present invention.

Further, a Distributed Bragg reflector LD (DBR-LD) and so forth can also be used in addition to the DFB-LD as the light-emitting source constituting the multi-wavelength pulse light source 42. The important characteristic that the light-emitting source that constitutes the multi-wavelength pulse light source 42 should possess is that of superior monochromaticity of the oscillation light. That is, the half bandwidth of the oscillation spectrum of the light sources (DFB-LD or DBR-LD or the like) that are in a number equal to the number of channels constituting the multi-wavelength pulse light source 42 is narrow and the oscillation spectra thereof do not overlap on the wavelength axis.

The output light 43 of the multi-wavelength pulse light source 42 is distributed to each channel after being intensity-divided to the number of channels (four here) by the branching filter 44. That is, the first to fourth channels are supplied intensity-divided as the optical pulse trains 45a, 45b, 45c, and 45d. Therefore, the output light (optical pulse trains 45a, 45b, 45c, and 45d) of the output light of the multi-wavelength pulse light source 42 distributed to each channel is an optical pulse train that includes distinct oscillation wavelengths in a number equal to the number of channels.

The branching filter 44 is an optical device with a function for branching light that has been propagated by one optical fiber to a plurality of optical fibers and is also known as an optical coupler. Naturally, an optical coupler has a function for linking light that has been propagated by a plurality of fibers to one optical fiber. An optical coupler with such a function can be fabricated as follows.

The cladded sides of the plurality of optical fibers (here, the number of optical fibers is equal to the number of channels) are heat-sealed in a bonded state. The heat-sealed joined part is made narrow by means of extension until the shape from the unbonded part of the optical fiber to the heat-sealed joined part assumes a tapered shape. The extension is ended at the stage where the narrow extended tip has the same thickness as the plurality of optical fibers of the base. Thereafter, in order to secure adequate mechanical strength and temperature stability for the optical coupler, the optical coupler is finished by being fixed to a small glass case or similar with a linear expansion coefficient by means of adhesive or the like.

The optical pulse train that is inputted from the extended narrow tip is an optical pulse train that is propagated after being intensity-divided to a plurality of individual bonded optical fibers. Thus, if an optical coupler is used such that the extended narrow tip thereof is the input end and the tip of the unbonded part of the optical coupler is the output end, the optical coupler can be made to function as a branching filter. Further, if the input and output ends for the light are established as the reverse of the above, that is, the extended narrow tip is used as the light output end and the tip of the unbonded part is the light input end, the optical coupler can be made to function as a mixer. Therefore, it can be seen that the above optical coupler can be used as the branching filter 44 and the subsequently described branching filter 82 and mixer 70.

Naturally, optical devices other than the above-mentioned optical coupler can also be used as the branching filter 44, branching filter 82 and mixer 70. The functions that the branching filter 44, branching filter 82 and mixer 70 are supposed to possess permit the division of light that has been propagated via one optical fiber and, conversely, the mixing of a plurality of light.

The subsequent description of the encoding portion is common to each channel and, therefore, the first channel will be described by way of example. The encoding portion 60 of the first channel is constituted comprising a modulated electrical signal production portion 46, modulator 48, and encoder 50. As will be described subsequently, only the required constituent elements of the encoding portion 60 of the first channel are illustrated in FIG. 6. Therefore, in the subsequent description, the encoding portion 60 of the first channel is abbreviated as the first channel 60 of the transmission portion for the sake of an expedient description or is sometimes simply written as the encoding portion 60. Further, similarly, the encoding portion 62 of the second channel, the encoding portion 64 of the third channel, and the encoding portion 66 of the fourth channel are abbreviated simply as the second channel 62, third channel 64, and fourth channel 66.

The second channel 62, third channel 64, and fourth channel 66 have similar structures to that of the first channel 60. The difference lies with the time spreading/wavelength hopping code that is set for the encoder that each of the channels comprises. The time spreading/wavelength hopping code is made distinct for each channel. As a result, an optical pulse signal can be sent and received independently on each channel. With the exception of the encoder, all of the first to fourth channels have the same structure.

The encoding portion 60 is a part that executes an encoding step of generating an encoded optical pulse signal by encoding an optical pulse signal containing light of distinct wavelengths in a number equal to the number of channels by using time spreading/wavelength hopping code.

As described hereinabove, the constituent elements required for constituting the encoding portion 60 are the modulated electrical signal production portion 46, modulator 48, and encoder 50. The modulated electrical signal production portion 46 executes a step to produce an electrical pulse signal 47 that represents a transmission signal. The electrical pulse signal 47 is an electrical signal that is generated as a binary digital electrical signal that reflects transmission information that is allocated to the first channel.

The modulator 48 executes a step of converting an optical pulse train 45a to an optical pulse signal 49 by means of the electrical pulse signal 47. The optical pulse train 45a is intensity-modulated to the RZ format that reflects the electrical pulse signal 47 by means of the modulator 48 and is generated as the optical pulse signal 49. An EAM, for example, can be used as the modulator 48. Naturally, the present invention is not limited to an EAM. It is also possible to use a Mach-Zehnder Interference Type Optical Modulator or the like that utilizes the Pockels effect. The characteristic that the modulator 48 is supposed to have is that of being capable of high-speed optical modulation by means of the bit rate of the electrical pulse signal 47.

The encoder 50 executes a step of generating an encoded optical pulse signal 61 by encoding the optical pulse signal 49 by using time spreading/wavelength hopping code. The encoder 50 comprises an FBG that possesses a function to generate an encoded optical pulse signal 61 by encoding the optical pulse signal 49 by means of the time spreading/wavelength hopping code. Naturally, as long as the FBG has a function to generate the encoded optical pulse signal 61 by encoding the optical pulse signal 49 by means of the time spreading/wavelength hopping code, optical devices other than the FBG need not be used provided in the encoder 50.

Further, a decoder 84 that is provided in the reception-portion first channel 100 of the reception portion 80 also has the same structure as the FBG with a function to generate the encoded optical pulse signal 61 by encoding the optical pulse signal 49 supplied to the encoder 50 by means of time spreading/wavelength hopping code.

The reception-portion first channel 100 that the reception portion 80 comprises a decoding portion 108. The decoding portion 108 decodes the encoded optical pulse signal 81a that is intensity-divided and allocated to the first channel by using the same code as the time spreading/wavelength hopping code that is set for the encoder 50 of the first channel. As a result, the decoding portion 108 generates a playback optical pulse signal that comprises an auto-correlation waveform component of the optical pulse signal of the first channel and a cross correlation waveform component of the optical pulse signal of the second to fourth channels. Further, the decoding portion 108 only extracts the auto-correlation waveform component of the optical pulse signal of the first channel.

The decoding portion 108 comprises the decoder 84, a clock extractor 88, and a time gate 86.

The decoder 84 decodes the encoded optical pulse signal 81a as mentioned earlier and divides the playback optical pulse signal obtained by the decoding into a clock signal extraction signal 85a comprising one wavelength component (a chip pulse of wavelength $\lambda 1$ here) of the light contained in the optical pulse signal, and an optical pulse signal playback signal 85b that comprises the remaining waveform component (here, this is an optical pulse that comprises chip pulses of the wavelengths $\lambda 2$, $\lambda 3$, and $\lambda 4$ and light of the wavelengths $\lambda 2$, $\lambda 3$, and $\lambda 4$). The clock extractor 88 extracts a clock signal 89 from the clock signal extraction signal 85a. Further, the time gate 86 removes only the auto-correlation waveform component 87 of the optical pulse signal of the first channel from the optical pulse signal playback signal 85b.

The auto-correlation waveform component 87 generates a reception signal 91 of the first channel through conversion to the electrical signal by means of an optical receiver 90. The reception signal 91 only has a different intensity, the waveform thereof being the same as that of the electrical pulse signal 47 that is outputted by the modulated electrical signal production portion 46 that the encoding portion 60 of the first channel of the transmission portion 40 comprises. The electrical pulse signal 47 that is produced by the modulated electrical signal production portion 46 is an electrical pulse signal that represents a transmission signal that is transmitted via the first channel. Therefore, as is clear from the above description, the electrical pulse signal 47 that is to be transmitted via the first channel of the OCDM transceiver of the present invention is received as the reception signal 91 of the first channel by the reception portion 80.

Encoder and Decoder

The constitution of the encoder 50 and decoder 84 that comprise an FBG will now be described with reference to FIGS. 6A and 6B. The FBG that is used in the decoder 50 and decoder 84 of the first channel differs from the FBG that is utilized in the encoder and decoder of the second to fourth channels only with respect to the diffractive index distribution structure. The time spreading/wavelength hopping code is established by the diffractive index distribution structure.

Figure 6A:
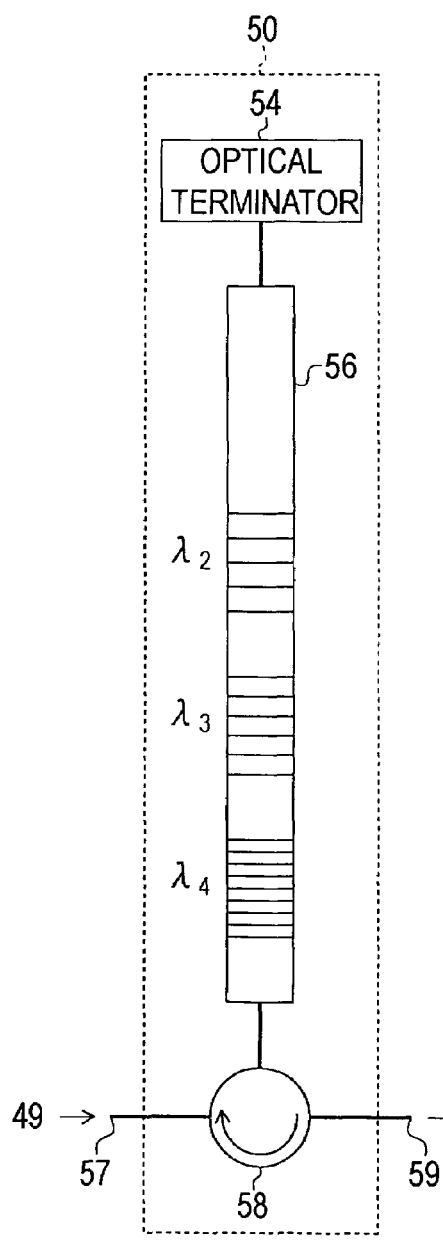
FIG. 6 is a schematic constitutional view of the encoder and decoder.
Figure 6B:
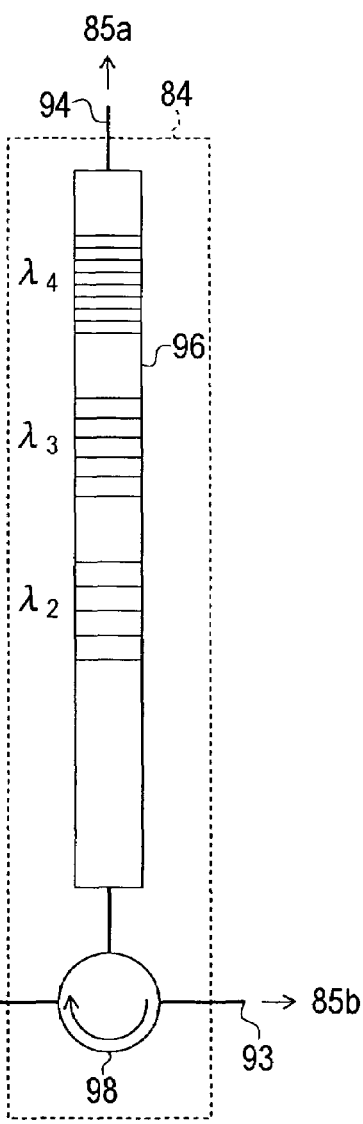

FIG. 6A is a schematic constitutional view of the encoder 50 and FIG. 6B is a schematic constitutional view of the decoder 84.

First, the constitution and functions of the encoder 50 will be described with reference to FIG. 6A. The encoder 50 comprises an input port 57 and output port 59. The optical pulse signal 49 that is inputted from the input port 57 is inputted via an optical circulator 58 to an FBG 56 that causes the optical pulse signal 49 to undergo Bragg reflection. The reflected light is once again outputted as the encoded optical pulse signal 61 from the output port 59 via the optical circulator 58.

The FBG 56 shown in FIG. 6A is constituted such that the constitution units of the diffractive index distribution structures indicated by $\lambda 2$, $\lambda 3$, and $\lambda 4$ are serially distributed in a single optical fiber. The constitution units are fiber gratings with the same overall length and in which the wavelengths indicated by $\lambda 2$, $\lambda 3$, and $\lambda 4$ are Bragg reflection wavelengths. Thereafter, these individual constitution units are called unit fiber gratings (units FBG).

That is, a component for which the wavelength of the optical pulse signal 49 is $\lambda 2$ is reflected by the FBG unit indicated by $\lambda 2$. Components for which the wavelengths of the optical pulse signal 49 are $\lambda 3$ and $\lambda 4$ are also reflected by the FBG units indicated by $\lambda 3$ and $\lambda 4$. Stated differently, in the case of the FBG unit indicated by $\lambda 2$, a component other than a component for which the wavelength of the optical pulse signal 49 is $\lambda 2$ is transmitted. Similarly also for the FBG units indicated by $\lambda 3$ and $\lambda 4$, components other than components for which the wavelengths of the optical pulse signal 49 are $\lambda 3$ and $\lambda 4$ are transmitted.

The FBG 56 is constituted by connecting the above FBG units in series. However, the positions in the FBG 56 in which the wavelength components constituting the optical pulse signal 49 are reflected are determined by the extent of the gap provided between adjacent FBG units. As a result, the FBG 56 is a reflector that has an inherent reflection characteristic (reflection spectrum) and a transmission characteristic (transmission spectrum) that depends on which positions and in what order FBG units with Bragg reflection wavelengths indicated by $\lambda 2$, $\lambda 3$ and $\lambda 4$ are arranged.

That is, as a result of this inherent reflection characteristic, the optical pulse signal 49 inputted via the optical circulator 58 produces wavelength dispersion on the basis of the inherent reflection and transmission characteristic at the time of an output from the FBG 56. The inherent waveform dispersion is determined by the particular positions in the FBG 56 and the order in which the FBG units with the Bragg reflection wavelengths indicated by $\lambda 2$, $\lambda 3$ and $\lambda 4$ are arranged. That is, the inherent wavelength dispersion characteristic is used as time spreading/wavelength hopping code.

The constitution and function of the decoder 84 will be described next with reference to FIG. 6B. The decoder 84 has an input port 92, a first output port 93, and a second output port 94. The encoded optical pulse signal 81a that is inputted from the input port 92 is inputted via an optical circulator 98 to an FBG 96 that causes the encoded optical pulse signal 81a to undergo Bragg reflection. The reflected light is then outputted once again as the optical pulse signal playback signal 85b from the first output port 93 via the optical circulator 98. Further, transmitted light from the FBG 96 is outputted from the second output port 94 as the clock signal extraction signal 85a.

Here, an explanation of why the pre-encoding optical pulse signal is played back as a playback optical pulse signal when the encoded optical pulse signal that is encoded by the encoder is decoded by the decoder for which the same code as that used when the signal was encoded is established will be provided. That is, an explanation of why a playback optical pulse signal consisting of the sum of the auto-correlation waveform component and the cross correlation waveform component is obtained when the encoded optical pulse signal is decoded by the decoder for which the same code as that used when the signal was encoded is established will be provided.

The encoded optical pulse signal 61 that is obtained as a result of the encoding by the encoder 50 reflects a waveform dispersion characteristic on the basis of the inherent FBG unit placement order and placement gaps between the FBG units of the FBG 56 that is provided in the encoder 50.

That is, for FBG 56 FBG units for which the Bragg reflection waveforms are $\lambda 4$, $\lambda 3$, and $\lambda 2$ are arranged at predetermined intervals in order starting with the side where the optical circulator 58 is installed. Hence, when the optical pulse signal 49 that includes light of the wavelengths $\lambda 1$, $\lambda 2$, $\lambda 3$, and $\lambda 4$ is inputted to the FBG 56 via the optical circulator 58, an optical pulse component of wavelength $\lambda 4$ (chip pulse of wavelength $\lambda 4$) is first reflected. Thereafter, an optical pulse component of wavelength $\lambda 3$ (chip pulse of wavelength $\lambda 3$) is reflected by establishing a time interval that corresponds to the placement gap between an FBG unit with a Bragg reflection wavelength of $\lambda 4$ and an FBG unit with a Bragg reflection wavelength of $\lambda 3$. Similarly, an optical pulse component of wavelength $\lambda 2$ (chip pulse of wavelength $\lambda 2$) is reflected by establishing a time interval that corresponds to the placement gap between an FBG unit with a Bragg reflection wavelength of $\lambda 3$ and an FBG unit with a Bragg reflection wavelength of $\lambda 2$.

As a result of such a phenomenon, in the case of the optical pulse signal 49 that is inputted to the FBG 56 via the optical circulator 58, all the components of light with the wavelengths $\lambda 1$, $\lambda 2$, $\lambda 3$, and $\lambda 4$ of the respective optical pulses that constitute the optical pulse signal 49 occupy the same position on the time axis, whereas, when the optical pulse signal 49 is outputted by the FBG 56, the components are lined up separately on the time axis in the order chip pulse with the wavelength $\lambda 4$, chip pulse with the wavelength $\lambda 3$, and then chip pulse with the wavelength $\lambda 2$. Further, the interval between these chip pulses on the time axis are determined in dependence on the placement interval of the FBG units with the Bragg reflection wavelengths $\lambda 2$, $\lambda 3$, and $\lambda 4$.

Figure 5:
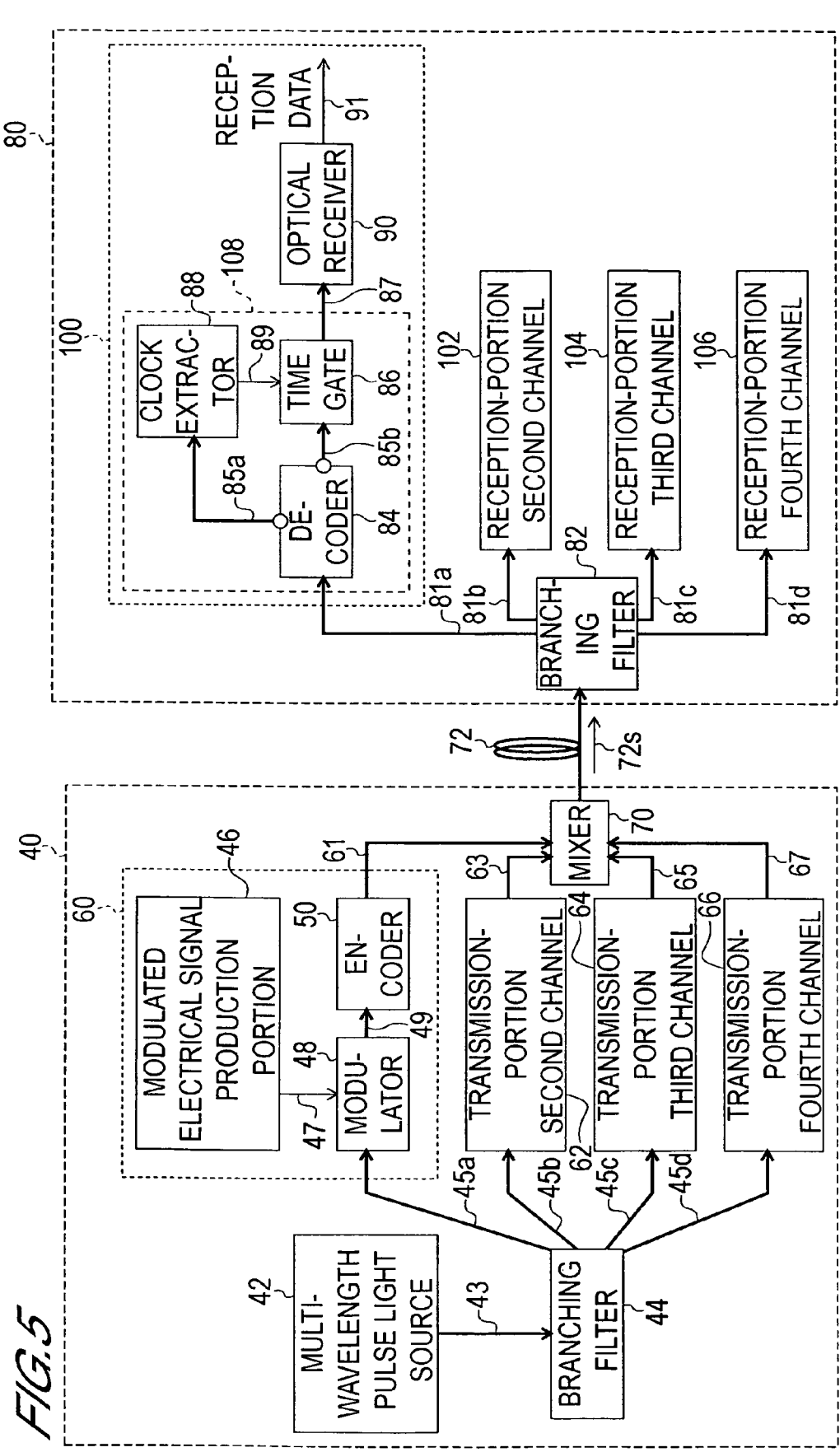
FIG. 5 is a schematic block constitutional view of the OCDM transceiver of the present invention.

Meanwhile, as shown in FIG. 5, the encoded optical pulse signal 81a that is inputted from the input port 92 of the decoder 84 is an encoded optical pulse signal that is obtained as a result of the transmission signal 72s generated by multiplexing the encoded optical pulse signals 61, 63, 65, and 67 of all the channels by means of the mixer 70 being intensity-divided by means of the branching filter 82. Therefore, the encoded optical pulse signal 81*a* comprises the respective encoded optical pulse signals 61, 63, 65, and 67 of all the channels.

The FBG 96 installed in the decoder 84 has the same structure as the FBG 56 installed in the encoder 50. However, the end facing the optical circulator 58 and optical circulator 98 is the reverse for the FBG 56 and FBG 96.

As a result, when consideration is paid to the encoded optical pulse signal component of the first channel (an optical pulse signal component with the same time waveform and so forth as the encoded optical pulse signal 61 that only differs in intensity) in the encoded optical pulse signal 81*a* that is inputted from the input port 92, the following is apparent.

That is, as mentioned earlier, the encoded optical pulse signal of the first channel is lined up on the time axis in the order of a chip pulse of wavelength $\lambda 4$, a chip pulse of wavelength $\lambda 3$, and a chip pulse of wavelength $\lambda 2$. The placement order and placement interval on the time axis of these chip pulses is determined by the placement interval and placement order of the FBG units with Bragg reflection wavelengths $\lambda 2$, $\lambda 3$, and $\lambda 4$ in the FBG 56.

On the other hand, because the ends facing the optical circulator 58 and optical circulator 98 of the FBG 56 installed in the encoder 50 and the FBG 96 installed in the decoder 84 respectively are reversed, the wavelength dispersion effect that is produced by the FBG 56 and the wavelength dispersion effect produced by the FBG 96 are expressed as mutually opposite effects on the time axis. That is, the wavelength dispersion effect produced by the FBG 56 causes dispersion on the time axis in the order of a chip pulse of wavelength $\lambda 4$, a chip pulse of wavelength $\lambda 3$, and a chip pulse of wavelength $\lambda 2$, whereas the wavelength dispersion effect produced by the FBG 96 is an effect that causes dispersion on the time axis in the order of a chip pulse of wavelength $\lambda 2$, a chip pulse of wavelength $\lambda 3$, and a chip pulse of wavelength $\lambda 4$.

As a result, the encoded optical pulse signal component of the first channel that is inputted from the input port 92 is played back as a playback optical pulse signal with the same time waveform as the optical pulse signal 49 of the first channel although the light intensity is different because the waveform dispersion effect produced by the FBG 56 is offset by the waveform dispersion effect produced by the FBG 96. The played back playback optical pulse signal is the auto-correlation waveform of the optical pulse signal 49 of the first channel. The auto-correlation waveform of the optical pulse signal 49 of the first channel is outputted by the first output port 93.

The encoded optical pulse signal 81*a* that is inputted from the input port 92 of the decoder 84 contains all the encoded optical pulse signals 61, 63, 65, and 67 of all the channels as mentioned earlier. The offsetting by the waveform dispersion effect that is produced by the FBG 96 is a waveform dispersion effect produced by the FBG 56 and the waveform dispersion effect produced by the encoders for encoding the optical pulse signals of the second to fourth channels is not offset by the FBG 96. As a result, the encoded optical pulse signals obtained as a result of the encoding of the optical pulse signals of the second to fourth channels are outputted without being decoded as cross correlation waveform components from the first output port 93 at the same time as the auto-correlation waveform above.

Further, the encoded optical pulse signal 81*a* that is inputted from the input port 92 of the decoder 84 includes the light of wavelengths $\lambda 1$, $\lambda 2$, $\lambda 3$, and $\lambda 4$. Further, the FBG 96 installed in the decoder is provided with FBG units with the Bragg reflection wavelengths $\lambda 1$, $\lambda 2$, $\lambda 3$, and $\lambda 4$ respectively. Therefore, the waveform components of light constituting the auto-correlation waveform and cross correlation waveform component outputted by the first output port 93 are the light components $\lambda 2$, $\lambda 3$, and $\lambda 4$. That is, the first output port 93 outputs an optical pulse constituting chip pulses of wavelengths $\lambda 2$, $\lambda 3$, and $\lambda 4$ and light components with the wavelengths $\lambda 2$, $\lambda 3$, and $\lambda 4$.

Meanwhile, the light component of wavelength $\lambda 1$ (chip pulse of wavelength $\lambda 1$) among the light components of wavelengths $\lambda 1$, $\lambda 2$, $\lambda 3$, and $\lambda 4$ that constitute the encoded optical pulse signal 81*a* that is inputted from the input port 92 of the decoder 84 is outputted by the second output port 94 of the decoder 84 instead of being reflected by the FBG 96. The chip pulse of wavelength $\lambda 1$ that is outputted from the second output port 94 is used to enable the clock extractor 88 to extract a clock signal as the clock signal extraction signal 85*a*.

Operating Principles of Decoding Portion

The relationship between the waveform of the input signal to the input port of the encoder and decoder and the waveform of the output signal from the first and second output ports will now be described with reference to FIG. 7. Here, although the four-channel OCDM transceiver shown in FIG. 5 will be described here, the description is not limited to the same four-channel devices, being equally valid for any number of channels. In the following description, because the encoders and decoders all share a function for arranging optical pulses constituting an input signal by means of time spreading/wavelength hopping on the time axis, both the encoders and decoders can also be referred to as code diffusers.

For the sake of an expedient description, codes that are set for encoders and decoders of the first to fourth channels are Code 1 to Code 4 shown below. Naturally, other codes may also be set but the codes set for each channel must be distinct.

Code $1=(\lambda 4,0,0,0,0, \lambda 3,0,0,0,0, \lambda 2,0,0,0,0)$

Code $2=(0,0,0,0,0,0, \lambda 1, \lambda 4,0,0,0,0,0, \lambda 2,0,0)$

Code $3=(\lambda 2,0,0,0,0,0,0,0,0, \lambda 1,0, \lambda 3,0,0,0,0)$

Code $4=(\lambda 1,0,0,0,0,0,\lambda 4,0,0, \lambda 3,0,0,0,0,0,0)$

First, the functions of the encoder of the four-channel OCDM transceiver shown in FIG. 5 will be described with reference to FIGS. 7A to 7D. Therefore, it can be understood that the blocks indicating code diffusers 110, 112, 114, and 116 shown in FIGS. 7A to 7D are the first to fourth channel encoders.

Figure 7A:
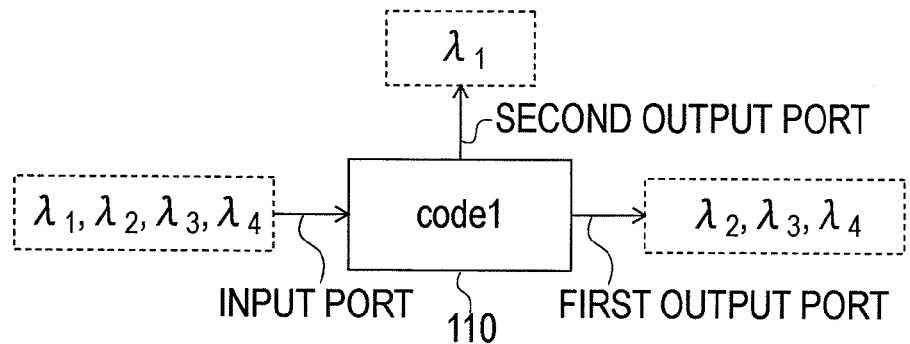
FIG. 7 shows the wavelengths of light outputted by the first and second output ports of the decoder.

FIG. 7A shows the relationship between the waveform of the input signal inputted to the input port of the code diffuser 110 for which the code supplied by Code 1 is set and the waveform of the output signal from the first and second output ports. The relationship between the input port and the first and second output ports of the encoder 50 shown in FIGS. 7A and 6A is as follows.

That is, the input port of the code diffuser 110 shown in FIG. 7A corresponds to the input port 57 of the encoder 50 shown in FIG. 6A and the first and second output ports shown in FIG. 7A correspond to the output port 59 and optical terminator 54 of the encoder 50 shown in FIG. 6A. Code supplied by Code 1 is set for the encoder of the first channel and, therefore, the FBG that executes encoding is constituted with the FBG unit arranged exactly as per FBG 56 shown in FIG. 6A.

The optical pulse signal that is inputted from the input port contains light components of wavelengths $\lambda 1$, $\lambda 2$, $\lambda 3$, and $\lambda 4$. When the input optical pulse signal is inputted to the code diffuser 110, the wavelength component constituting the code set for Code 1 is light of the wavelengths λ2, λ3, and λ4, the light of wavelength λ1 being transmitted instead of being reflected by the FBG constituting the code diffuser 110. Further, the transmitted light of wavelength λ1 is absorbed by the optical terminator. Meanwhile, the light components of wavelengths λ2, λ3, and λ4 (chip pulses of wavelengths λ2, λ3, and λ4) are reflected by the FBG constituting the code diffuser 110 and outputted from the first output port.

Figure 7B:
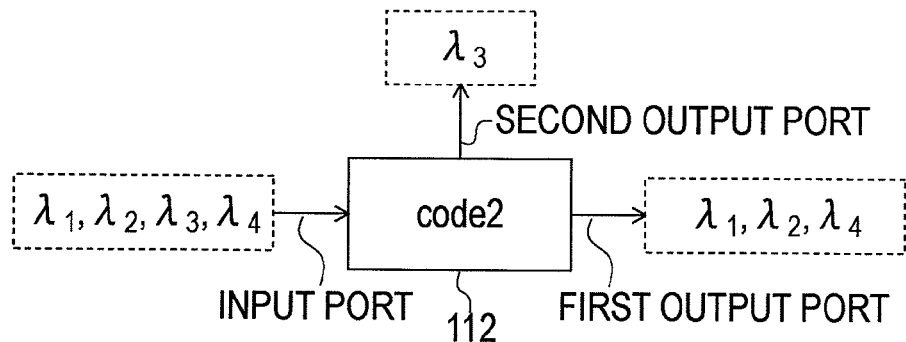
Figure 7C:
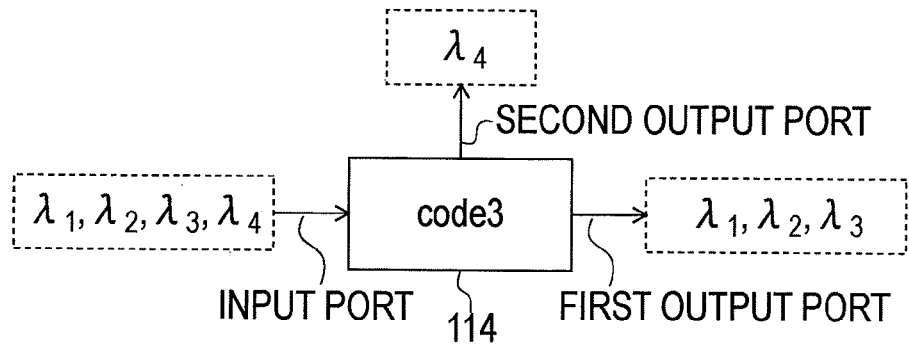
Figure 7D:
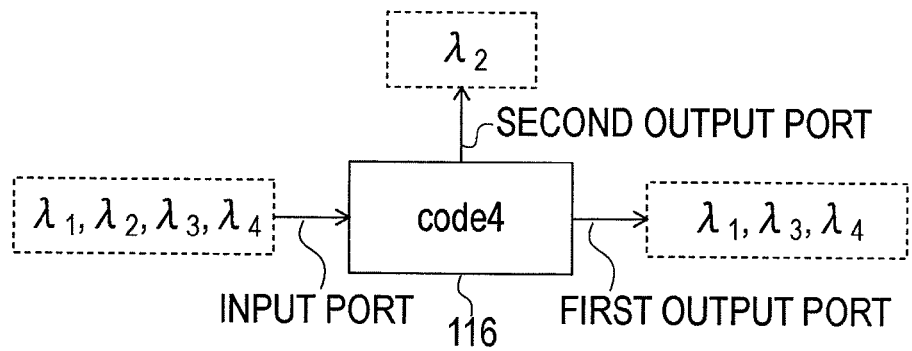

Similarly, FIGS. 7B to D are block diagrams that illustrate the relationship between the wavelengths of the input signals to the input ports of the code diffusers 112 to 116 for which codes supplied by Code 2 to Code 4 respectively are set and the wavelengths of the output signals from the first and second output ports.

Code that is supplied by Code 2 is set for the encoder 112 of the second channel and the wavelength component constituting the code set for Code 2 is light of wavelengths λ1, λ2, and λ4. Therefore., light of wavelength λ3 is transmitted instead of being reflected by the FBG that constitutes the code diffuser 112. Further, the transmitted light of wavelength λ3 is absorbed by the optical terminator. Meanwhile, the light components of wavelengths λ1, λ2, and λ4 (chip pulses of wavelengths λ1, λ2, and λ4) are reflected by the FBG constituting the code diffuser 112 and outputted from the first output port.

Code that is supplied by Code 3 is set for the encoder 114 of the third channel and wavelength components constituting the code set for Code 3 is light of wavelengths λ1, λ2, and λ3. Therefore, light of wavelength λ4 is transmitted instead of being reflected by the FBG constituting the code diffuser 114. The transmitted light of wavelength λ4 is absorbed by the optical terminator. Meanwhile, light components of wavelengths λ1, λ2, and λ3 (chip pulses of wavelengths λ1, λ2, and λ3) are reflected by the FBG constituting the code diffuser 114 and outputted from the first output port.

Code that is supplied by Code 4 is set for the encoder 116 of the fourth channel and wavelength components constituting the code set for Code 4 is light of wavelengths λ1, λ3, and λ4. Therefore, light of wavelength λ2 is transmitted instead of being reflected by the FBG constituting the code diffuser 116. The transmitted light of wavelength λ2 is absorbed by the optical terminator. Meanwhile, light components of wavelengths λ1, λ3, and λ4 (chip pulses of wavelengths λ1, λ3, and λ4) are reflected by the FBG constituting the code diffuser 116 and outputted from the first output port.

The functions of the decoder of the four-channel OCDM transceiver shown in FIG. 5 will be described next with reference to FIGS. 7A to 7D. Therefore, it can be understood that the blocks indicating code diffusers 110, 112, 114, and 116 shown in FIGS. 7A to 7D are the first to fourth channel encoders.

Code that is supplied by Code 1 is set for the decoder 110 of the first channel and wavelength components constituting the code set for Code 1 is light of wavelengths λ2, λ3, and λ4. Therefore, light of wavelength λ1 is transmitted instead of being reflected by the FBG constituting the code diffuser 110. The transmitted light of wavelength λ1 is then outputted by the second output port. The second output port corresponds to the second output port 94 of the decoder 84 shown in FIG. 6B. Meanwhile, light components of wavelengths λ2, λ3, and λ4 (chip pulses of wavelengths λ2, λ3, and λ4) are reflected by the FBG constituting the code diffuser 110 and outputted from the first output port. The first output port corresponds to the first output port 93 of the decoder 84 shown in FIG. 6B.

Code that is supplied by Code 2 is set for the decoder 112 of the second channel and wavelength components constituting the code set for Code 2 is light of wavelengths λ1, λ2, and λ4. Therefore, light of wavelength λ3 is transmitted instead of being reflected by the FBG constituting the code diffuser 112. The transmitted light of wavelength λ3 is then outputted from the second output port. Meanwhile, light components of wavelengths λ1, λ2, and λ4 (chip pulses of wavelengths λ1, λ2, and λ4) are reflected by the FBG constituting the code diffuser 112 and outputted from the first output port.

Code that is supplied by Code 3 is set for the decoder 114 of the third channel and wavelength components constituting the code set for Code 3 is light of wavelengths λ1, λ2, and λ3. Therefore, light of wavelength λ4 is transmitted instead of being reflected by the FBG constituting the code diffuser 114. The transmitted light of wavelength λ4 is then outputted by the second output port. Meanwhile, light components of wavelengths λ1, λ2, and λ3 (chip pulses of wavelengths λ1, λ2, and λ3) are reflected by the FBG constituting the code diffuser 114 and outputted from the first output port.

Code that is supplied by Code 4 is set for the decoder 116 of the fourth channel and wavelength components constituting the code set for Code 4 is light of wavelengths λ1, λ3, and λ4. Therefore, light of wavelength λ2 is transmitted instead of being reflected by the FBG constituting the code diffuser 116. The transmitted light of wavelength λ2 is then outputted from the second port. Meanwhile, light components of wavelengths λ1, λ3, and λ4 (chip pulses of wavelengths λ1, λ3, and λ4) are reflected by the FBG constituting the code diffuser 116 and outputted from the first output port.

The operating principles of the decoding portion constituting the principal constituent part of the present invention in particular will be described next by taking the example of a case where optical pulse signals are sent and received by a four-channel OCDM transceiver with reference to FIGS. 5 to 8. In FIG. 8, the horizontal axis is a time axis that shows time by means of an optional scale and the vertical axis shows light intensity by means of an optional scale.

Suppose that code that is set for the encoders provided for the first to fourth channels of the transmission portion 40 is Code 1 to Code 4 as per the above description. Further, suppose that the code set for the decoder that is set for the first to fourth channels of the reception portion 80 is also Code 1 to Code 4 as per the above description.

Here, for the purpose of simplification, this will be described by taking the example of an optical signal that sends and receives an optical pulse train. However, in the case of optical pulse signals that are actually sent and received, points at which time slots in which optical pulses exist and time slots in which optical pulses do not exist on the time axis differ are different depending on the content of the transmitted signal. So too in the case of optical pulse signals, the following description is valid for time slots in which optical pulses exist. Further, because time slots where optical pulses do not exist are areas where the light pulses do not originally exist on the time axis, a particular explanation of such time slots is probably not required in the following description.

Figure 8A:
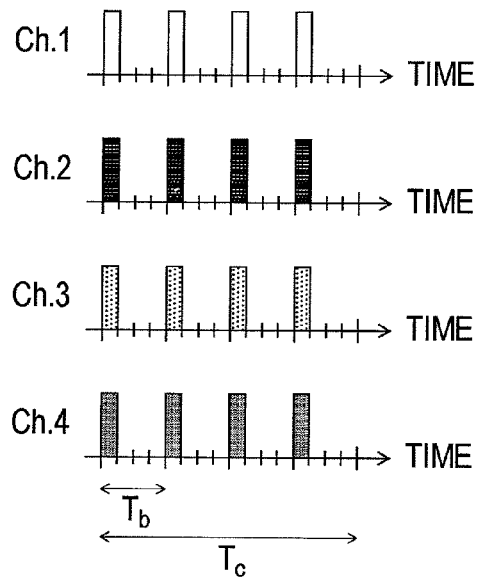
FIG. 8 serves to illustrate the operating principles of a 4-channel multiplexing OCDM transceiver.

FIG. 8A shows the optical pulse signals that are outputted from the modulators of the first to fourth channels. In FIG. 8A, the optical pulse signals outputted from the respective modulators of the first to fourth channels are shown as Ch. 1, Ch. 2, Ch. 3, and Ch. 4. That is, the optical pulse signal indicated by Ch. 1 represents the optical pulse signal 49 outputted by the modulator 48 in FIG. 5. The optical pulses constituting the optical pulse signal of each channel shown in FIG. 8A all contain light of wavelengths λ1, λ2, λ3, and λ4. Here, a pattern that is different for each channel is executed for the optical pulses constituting the optical pulse signals of each channel in order to distinguish each channel.

Figure 8B:
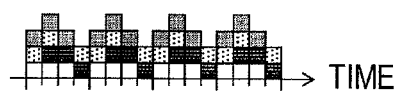

The optical pulse signals that are outputted by the modulators of the first to fourth channels are encoded for each channel to produce the optical pulse signals (61, 63, 65, and 67) which are multiplexed by the mixer 70 to produce the transmission signal 72s. FIG. 8B shows the transmission signal 72s.

Here, the same patterns as the patterns provided in FIG. 8A are implemented for each chip pulse belonging to each channel in correspondence with FIG. 8A in order to be able to identify which chip pulse belongs to which channel. Therefore, these patterns do not identify the light of wavelengths $\lambda 1$, $\lambda 2$, $\lambda 3$, and $\lambda 4$. In FIGS. 8A to 8D, the relationship between the wavelengths of optical pulses corresponding to each channel and the light contained in chip pulses is shown in FIG. 7.

Figure 8C:
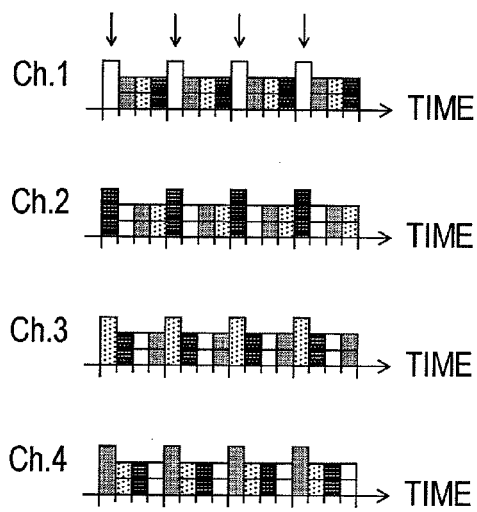

The transmission signal 72s is intensity-divided into encoded optical pulse signals 81a, 81b, 81c, and 81d in a number equal to the number of channels by the branching filter 82. Of these, the encoded optical pulse signal 81a of the first channel is divided into the clock signal extraction signal 85a and the optical pulse signal playback signal 85b by the decoder 84. In FIG. 8C, the optical pulse playback signal 85b that is outputted from the first output port of the decoder 84 is shown as Ch. 1. The optical pulse signals of the second to fourth channels are likewise divided into a clock signal extraction signal and optical pulse signal playback signal by the respective decoders that are provided for each channel. The optical pulse signal playback signals of the first to fourth channels are shown as Ch. 1 to Ch. 4 respectively in FIG. 8C.

In FIG. 8C, the signal constitution is described by taking the example of the optical pulse signal playback signal of the first channel shown by Ch. 1. As described earlier, the optical pulse signal playback signal of the first channel contains an auto-correlation waveform component and a cross correlation waveform component of the optical pulse signal transmitted from the first channel. In FIG. 8C, optical pulses indicated by downward arrows are auto-correlation waveform components and other optical pulses are cross correlation waveform components.

It can be seen that the auto-correlation waveform components have the same pattern as the optical pulses of the first channel indicated by Ch. 1 shown in FIG. 8A. However, the intensity is ¾ of the optical pulse shown in FIG. 8A. This is because the light component of wavelength $\lambda 1$ is separated by the decoder as a clock signal extraction signal. That is, the optical pulse indicated by the downward arrow in FIG. 8C contains the wavelengths $\lambda 2$, $\lambda 3$, and $\lambda 4$.

The same is also true of the second to fourth channels. That is, in FIG. 8C, the optical pulse signal playback signal of Ch. 2 also contains the auto-correlation waveform component and cross correlation waveform component of the optical pulse signal that is transmitted from the second channel. Of these components, the auto-correlation waveform component is afforded the same pattern as that of the optical pulses of the optical pulse signal of the second channel that is indicated by Ch. 2 shown in FIG. 8A. Similarly also for the third and fourth channels, the auto-correlation waveform components are each afforded the same patterns as those of the optical pulses of the optical pulse signals of the third and fourth channels indicated by Ch. 3 and Ch. 4 respectively that are shown in FIG. 8A.

Figure 8D:

In FIG. 8D, the clock signal extraction signals of the first to fourth channels are each shown as Ch. 1 to Ch. 4. In FIG. 8D, the clock signal extraction signal shown as Ch. 1 is the clock signal extraction signal 85a that is outputted from the second output port of the decoder 84.

Time areas in which chip pulses do not exist cyclically at intervals of a chip cycle $T_b$ exist in positions that are indicated by upward arrows in FIG. 8D (See the illustration indicated by Ch. 1 in FIG. 8D). Therefore, a clock signal can be extracted by detecting the cycles of the time areas where chip pulses do not exist. In order to extract the clock signal, the clock signal extraction signal 85a is converted into an electrical signal by means of a photo-detector or the like and the clock signal 89 is extracted (clock signal 89 is shown in FIG. 5) from the electrical signal by an existing clock signal extraction circuit.

The auto-correlation waveform component is extracted by getting the optical pulse signal playback signal shown in FIG. 8C by inputting the above clock signal to the time gate of each channel. If the auto-correlation waveform component is O/E converted by means of the photo-detector or the like, a reception signal is generated for each channel. The reception signals only differ in intensity and are signals with the same shape as the electrical pulse signals outputted from the modulated electrical signal production portions with which the encoders of the transmission portions of each channel are equipped.

Study on Intensity of Auto-Correlation Waveform Component

Figure 9A:
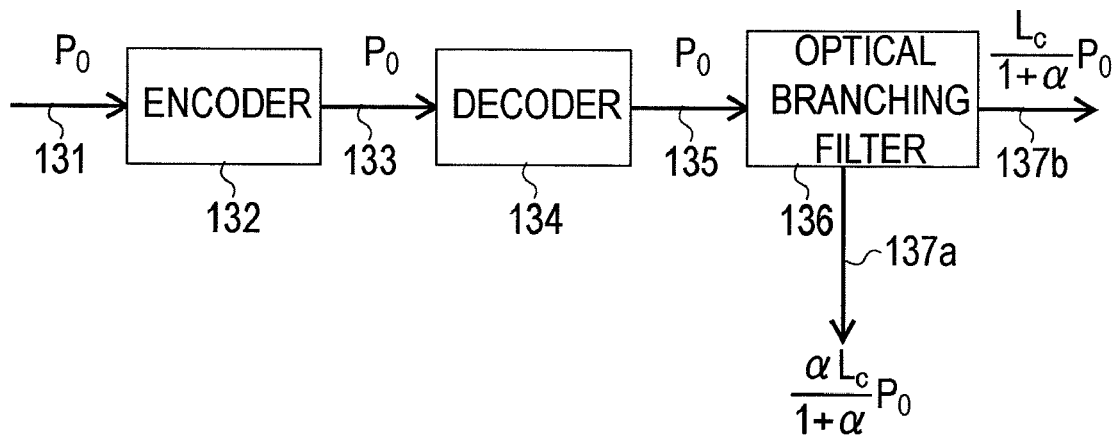
FIG. 9 is a schematic block constitutional view of a conventional OCDM transceiver and the OCDM transceiver of the present invention.
Figure 9B:
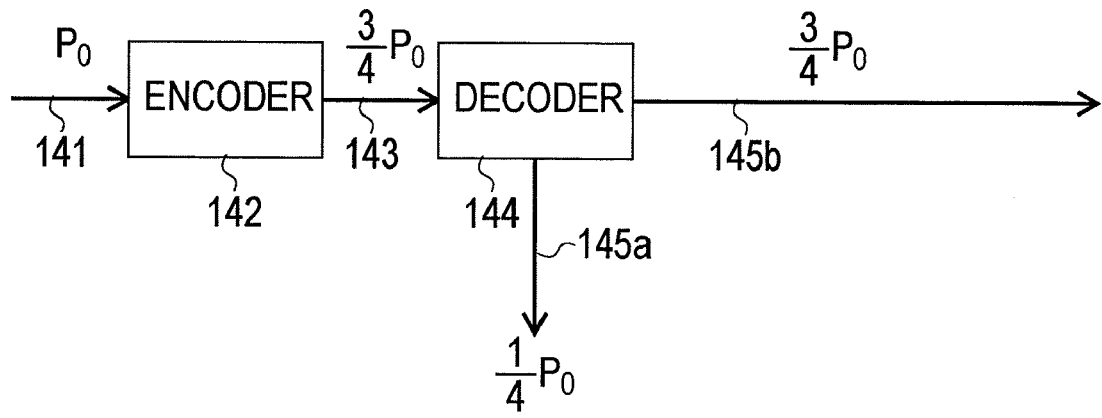

Here, the intensity of the auto-correlation waveform component that is extracted from the playback optical pulse signal (correlation waveform signal) by performing time gate processing after decoding will be considered with reference to FIG. 9. FIG. 9A is a schematic block constitutional view of a conventional OCDM transceiver and FIG. 9B is a schematic block constitutional view of the OCDM transceiver of the present invention. Both figures only show the parts required to study the intensity of the auto-correlation waveform component, the other parts being omitted or shown in simplified form.

In the case of a conventional OCDM transceiver shown in FIG. 9A, an optical pulse signal 131 is encoded by an encoder 132 and then outputted as an encoded optical pulse signal 133. The encoded optical pulse signal 133 is transmitted and decoded by the decoder 134 of the reception portion before being outputted as a playback optical pulse signal 135. The playback optical pulse signal 135 is then inputted to an optical branching filter 136 and divided into a clock signal extraction signal 137a and optical pulse signal playback signal 137b before being outputted.

Meanwhile, in the OCDM transceiver of the present invention shown in FIG. 9B, an optical pulse signal 141 is encoded by an encoder 142 and outputted as an encoded optical pulse signal 143. The encoded optical pulse signal 143 is transmitted and decoded by a decoder 144 of the reception portion and then separated into a clock signal extraction signal 145a and optical pulse signal playback signal 145b before being outputted. That is, the optical pulse signal playback signal 145b is outputted from the first output port of the decoder 144, whereas the clock signal extraction signal 145a is outputted from the second output port.

Here, suppose that the intensity of the optical pulse signals that are sent and received on the respective channels (the optical pulse signals 131 and 141) is $P_0$. Thus, in the conventional OCDM transceiver shown in FIG. 9A, the intensity of the optical pulse signal 131, encoded optical pulse signal 133, and playback optical pulse signal 135 is $P_0$. The intensity of the optical pulse signal 141 of the OCDM transceiver of the present invention shown in FIG. 9B is also $P_0$.

First, suppose that the branching ratio of the optical branching filter 136 that is installed in the conventional OCDM transceiver shown in FIG. 9A is 1:$\alpha$. Suppose also that the attenuation ratio of the input light due to insertion loss of insertion into the optical branching filter 136 is $L_c$ (when $0 \leq L_c \leq 1$ and there is no attenuation, $L_c=1$). Thus, the intensity $P_\alpha$ of the clock signal extraction signal 137a that is outputted from the optical branching filter 136 and the intensity $P_1$ of the optical pulse signal playback signal 137b are given by the following equations:

$$P_1 = P_0 \times (L_c/(1+\alpha)) \tag{1}$$

$$P_\alpha = P_0 \times (\alpha L_c/(1+\alpha)) \tag{2}$$

Meanwhile, where the OCDM transceiver of the present invention is concerned, as is described with reference to FIGS. 7 and 8, in the case of a four-channel OCDM transceiver, the clock signal extraction signal 145a is rendered by separating only one wavelength among the wavelength components contained in the transmitted encoded optical pulse signal 143. Therefore, the intensity is $(¼)P_0$. Further, the optical pulse signal playback signal 145b is rendered by separating components other than the wavelength component that are contained in the clock signal extraction signal 145a and has an intensity of $(¾) P_0$.

Here, so that the intensity $P_\alpha$ of the clock signal extraction signal 137a separated by the conventional OCDM transceiver is equal to the intensity $(¼)P_0$ of the clock signal extraction signal 145a separated by the OCDM transceiver of the present invention, it is determined how may values of a providing the branching ratio of the optical branching filter 136 are necessary. That is, supposing that the $P_\alpha$ supplied by Equation (2) and $(¼)P_0$ are equal, $$P_0 \times (\alpha L_c/(1+\alpha)) = (¼)P_0 \tag{3}$$

When $\alpha$ that satisfies Equation (3) is found and inserted in Equation (1) that provides the intensity $P_1$ of the optical pulse signal playback signal 137b, $$P_1 = P_0 \times (L_c - (¼)) \tag{4}$$

It can be seen that, because the intensity of the optical pulse signal playback signal 145b of the present invention is $(¾)P_0$, in order to make $P_1$ provided by Equation (4) equal to $(¾)P_0$, $L_c = 1$ must be true. That is, it may be concluded that the attenuation ratio of the input light due to the insertion loss of insertion in the optical branching filter 136 is 1. In other words, this means that, in order to make the intensity $P_1$ of the clock signal playback signal 137b and the intensity $(¾)P_0$ of the optical pulse signal playback signal 145b equal, there must be no insertion loss into the optical branching filter 136.

Let us assume a case where a reduction amount such that the intensity of the input light decreases 20% as a result of insertion loss of insertion into the optical branching filter 136 is relatively small. That is, supposing that the attenuation ratio $L_c$ of the input light due to insertion loss of insertion into the optical branching filter 136 is $⅘(=0.8)$, the intensity $P_1$ of the optical pulse signal playback signal 137b provided by Equation (4) is then $P_1 = P_0 \times (⅘ - ¼) = {}^{11}/_{20} P_0$. When this value $({}^{11}/_{20}) P_0$ is compared with the intensity $(¾)P_0$ of the optical pulse signal playback signal 145b of the present invention, $(¾)P_0 / (({}^{11}/_{20})P_0) = (15/11) = 1.36$ results. That is, in comparison with a conventional OCDM transceiver, the OCDM transceiver of the present invention is capable of utilizing an optical pulse signal playback signal with an intensity of 1.36 times that of the former.

As described earlier, the OCDM transceiver of the present invention does not require an optical branching filter for separating the clock signal extraction signal from the playback optical pulse signal. Therefore, insertion loss that is produced by utilizing an optical branching filter is essentially not produced. As a result, it can be seen that the intensity decrease of the optical pulse signal playback signal (correlation waveform signal) can be made smaller than a conventional OCDM transceiver of the same type that requires an optical branching filter.

Further Constitutional Example of the Reception Portion

A further constitutional example of the reception portion 80 of the OCDM transceiver of the present invention will now be described with reference to FIG. 10. Because all the channels have the same constitution, this will be described here by taking the example of the reception-portion first channel 100. That is, another constitutional example of the reception-portion first channel 100 will be described. The following description is equally valid for the other channels.

The difference from the above reception-portion first channel 100 lies with a constitution in which the clock signal extraction signal that is outputted from the second output port of the decoder is inputted to the clock extractor via the optical bandpass filter.

Figure 10:
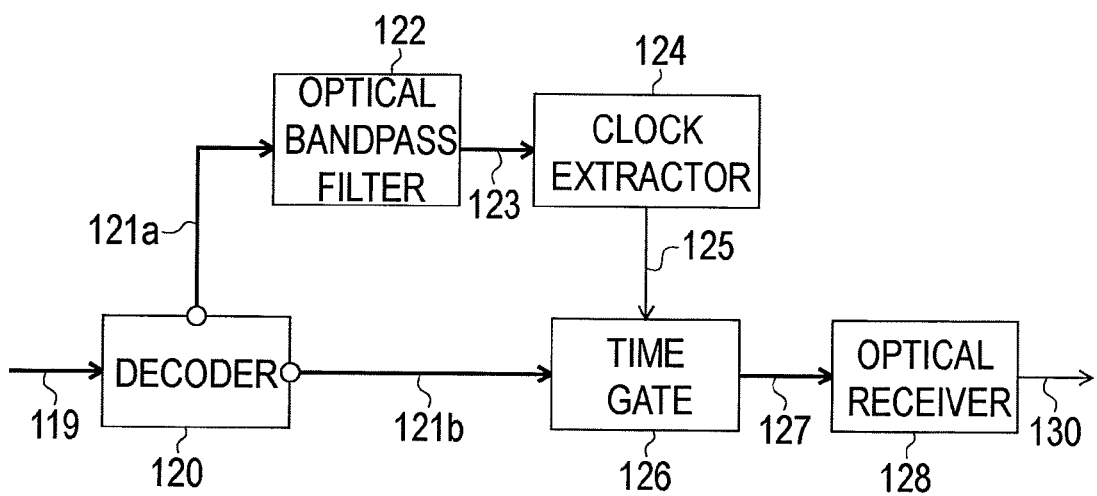
FIG. 10 is a schematic block constitutional view of another constitution example of the OCDM transceiver of the present invention.

As shown in FIG. 10, a further constitutional example of the reception-portion first channel 100 is constituted comprising a decoder 120, an optical bandpass filter 122, a clock extractor 124, a time gate 126, and an optical receiver 128.

An encoded optical pulse signal 119 is inputted to the decoder 120, whereby a clock signal extraction signal 121a and optical pulse signal playback signal (correlation waveform signal) 121b are outputted.

The clock signal extraction signal 121a has light components of wavelengths other than light of the wavelengths that are supposed to have originally constituted the clock signal extraction signal 121a removed by the optical bandpass filter 122. In the first channel, light of wavelengths other than wavelengths $\lambda_1$ is completely filtered and removed by the optical bandpass filter 122.

A clock signal extraction signal 123 that is outputted from the optical bandpass filter 122 is inputted to the clock extractor 124, whereby the clock signal 125 (corresponds with the clock signal 89 shown in FIG. 5) is outputted and the clock signal 125 is supplied to the time gate 126. Meanwhile, an optical pulse signal playback signal 121b outputted from the first output port of the decoder 120 is inputted to the time gate 126. The optical pulse signal playback signal 121b is time-gate processed by the time gate 126 by means of the clock signal 125, outputted as an auto-correlation waveform component 127, and converted to an electrical signal by the optical receiver 128, whereby the reception signal 30 is outputted.

The following advantages are obtained by newly installing the optical bandpass filter 122 in the reception portion.

First, a clock signal extraction signal that is outputted from the transmission side of the FBG constituting the decoder, that is, from the second port of the decoder contains light components (crosstalk) of wavelengths other than light of the wavelengths that originally constituted the clock signal extraction signal. This is because a portion of the chip pulse that is supposed to be reflected by the FBG unit is transmitted without being 100% reflected. Sometimes, when this crosstalk is contained in the clock signal extraction signal, this hinders extraction of the clock signal results.

Further, there are cases where an optical amplifier is installed midway along the transmission line 72 in the OCDM transceiver so that the transmission signal 72s rendered in many cases by multiplexing the encoded optical pulse signals of a plurality of channels is received with sufficient intensity on the reception side. When the transmission signal 72s is amplified by the optical amplifier, light of wavelengths other than those contained in the transmission signal 72s inputted to the optical amplifier are mixed and outputted. The light of wavelengths other than those contained in the transmission signal 72s is a spontaneously emitted light component that is produced by the optical amplifier. When, like the crosstalk, this spontaneously emitted light component is also contained in the clock signal extraction signal, this is sometimes an obstacle to the extraction of the clock signal.

Therefore, by installing an optical bandpass filter between the second output port of the decoder and the clock extractor, the spontaneously emitted light component produced by the crosstalk and optical amplifier can be removed. Thus, execution is possible while ensuring high reliability in the clock signal extraction step.

What is claimed is:

1. An optical code division multiplexing transmission and reception method, comprising:
    an encoding step of encoding an optical pulse signal that is allocated to each channel and transmitted and contains light of distinct wavelengths in a number equal to the number of channels by using a time spreading/wavelength hopping code that is distinct for each channel to generate an encoded optical pulse signal;
    a decoding step of decoding said encoded optical pulse signal of each of the channels by using code that is the same as said time spreading/wavelength hopping code to generate a playback optical pulse signal that contains a auto-correlation waveform component and cross correlation waveform component of said optical pulse signal and of extracting only said auto-correlation waveform component,
    wherein said decoding step comprises:
    a playback optical pulse signal separation step of separating said playback optical pulse signal into a clock signal extraction signal comprising one wavelength component of the light contained in said optical pulse signal and an optical pulse signal playback signal comprising the remaining wavelength component;
    a clock signal extraction step of extracting a clock signal from said clock signal extraction signal; and
    a time gate processing step of removing only said auto-correlation waveform component from said optical pulse signal playback signal,
    wherein said playback optical pulse signal separation step uses a Bragg reflection characteristic to separate said playback optical pulse signal into a clock signal extraction signal that comprises one wavelength component of the light that is contained in said optical pulse signal, and an optical pulse signal playback signal that comprises said remaining wavelength component.

2. The optical code division multiplexing transmission and reception method according to claim 1, wherein said decoding step further comprises a step of filtering said clock signal extraction signal.

3. The optical code division multiplexing transmission and reception method according to claim 1, wherein said encoding step comprises the steps of:
    producing an electrical pulse signal representing a transmission signal;
    converting an optical pulse train into the optical pulse signal by means of said electrical pulse signal; and
    encoding said optical pulse signal by using time spreading/wavelength hopping code to generate an encoded optical pulse signal.

4. The optical code division multiplexing transmission and reception method according to claim 2, wherein said encoding step comprises the steps of:
    producing an electrical pulse signal representing a transmission signal;
    converting an optical pulse train into said optical pulse signal by means of said electrical pulse signal; and
    encoding said optical pulse signal by using time spreading/wavelength hopping code to generate an encoded optical pulse signal.

5. The optical code division multiplexing transmission and reception method according to claim 2, wherein said playback optical pulse signal separation step uses a Bragg reflection characteristic to separate said playback optical pulse signal into a clock signal extraction signal that comprises one wavelength component of the light that is contained in said optical pulse signal, and an optical pulse signal playback signal that comprises said remaining wavelength component.

6. An optical code division multiplexing transceiver, comprising:
    an encoding portion for encoding an optical pulse signal that is allocated to each channel and transmitted and contains light of distinct wavelengths in a number equal to the number of channels by using a time spreading/wavelength hopping code that is distinct for each of the channels to generate an encoded optical pulse signal; and
    a decoding portion for decoding said encoded optical pulse signal of each of the channels by using code that is the same as said time spreading/wavelength hopping code to generate a playback optical pulse signal that contains a auto-correlation waveform component and cross correlation waveform component of the optical pulse signal, and extracting only said auto-correlation waveform component,
    wherein said decoding portion comprises a decoder for separating said playback optical pulse signal into a clock signal extraction signal comprising one wavelength component of the light contained in said optical pulse signal and an optical pulse signal playback signal comprising said remaining wavelength component;
    a clock extractor for extracting a clock signal from said clock signal extraction signal; and
    a time gate for removing only said auto-correlation waveform component from said optical pulse signal playback signal,
    wherein said decoder uses a Bragg reflection characteristic to separate said playback optical pulse signal into a clock signal extraction signal that comprises one wavelength component of the light that is contained in said optical pulse signal, and an optical pulse signal playback signal that comprises said remaining wavelength component.

7. The optical code division multiplexing transceiver according to claim 6, wherein said decoding portion further comprises an optical bandpass filter that filters said clock signal extraction signal.

8. The optical code division multiplexing transceiver according to claim 6, wherein said encoding portion comprises a modulation signal generator that produces an electrical pulse signal that represents a transmission signal;
    an optical modulator that converts an optical pulse train into said optical pulse signal by means of said electrical pulse signal; and
    an encoder that encodes said optical pulse signal by using time spreading/wavelength hopping code to generate an encoded optical pulse signal.

9. The optical code division multiplexing transceiver according to claim 7, wherein said encoding portion comprises a modulation signal generator that produces an electrical pulse signal that represents a transmission signal;

an optical modulator that converts an optical pulse train into said optical pulse signal by means of said electrical pulse signal; and an encoder that encodes said optical pulse signal by using time spreading/wavelength hopping code to generate an encoded optical pulse signal.

10. The optical code division multiplexing transceiver according to claim 8, wherein said encoder is constituted comprising a fiber Bragg grating.

11. The optical code division multiplexing transceiver according to claim 9, wherein said encoder is constituted comprising a fiber Bragg grating.

12. The optical code division multiplexing transceiver according to any one of claim 6, wherein said decoder is constituted comprising a fiber Bragg grating.

13. The optical code division multiplexing transceiver according to any one of claim 9, wherein said decoder is constituted comprising a fiber Bragg grating.

14. The optical code division multiplexing transceiver according to any one of claim 8, wherein said decoder is constituted comprising a fiber Bragg grating.

15. The optical code division multiplexing transceiver according to any one of claim 9, wherein said decoder is constituted comprising a fiber Bragg grating.

* * * * *